United States Patent [19]

Shaw et al.

[11] Patent Number: 4,556,279

[45] Date of Patent: Dec. 3, 1985

[54] PASSIVE FIBER OPTIC MULTIPLEXER

[75] Inventors: Herbert J. Shaw, Stanford; Michel J. F. Digonnet, Menlo Park, both of Calif.

[73] Assignee: Board of Trustees of the Leland Stanford Junior University, Stanford, Calif.

[21] Appl. No.: 319,301

[22] Filed: Nov. 9, 1981

[51] Int. Cl.$^4$ ............................................. G02B 5/172
[52] U.S. Cl. .................... 350/96.15; 350/96.16
[58] Field of Search ................ 250/227; 350/96.15, 350/96.16, 96.19, 96.20

[56] References Cited

U.S. PATENT DOCUMENTS

| | | |
|---|---|---|
| 3,957,341 | 5/1976 | Taylor . |
| 4,243,297 | 1/1981 | Elion ........................... 350/96.15 |
| 4,300,811 | 11/1981 | Ettenberg et al. .................. 350/1.1 |
| 4,301,543 | 11/1981 | Palmer .......................... 350/96.15 |
| 4,307,933 | 12/1981 | Palmer et al. .................... 350/96.16 |
| 4,315,666 | 2/1982 | Hicks, Jr. ....................... 350/96.15 |
| 4,335,933 | 6/1982 | Palmer .......................... 350/96.19 |
| 4,342,499 | 8/1982 | Hicks, Jr. ....................... 350/96.15 |
| 4,343,532 | 8/1982 | Palmer .......................... 350/96.19 |
| 4,362,359 | 12/1982 | Dammann et al. ............... 350/96.19 |

FOREIGN PATENT DOCUMENTS

| | | |
|---|---|---|
| 38023 | 10/1981 | European Pat. Off. . |
| 55-76308 | 6/1980 | Japan ............................ 350/96.15 |
| 1094639 | 12/1967 | United Kingdom . |

OTHER PUBLICATIONS

Bergh et al., *Electronics Letters*, vol. 16, No. 7, Mar. 27, 1980, "Single-Mode Fibre Optic Directional Coupler", pp. 260-261.

Kapany et al., J. of the Optical Society of America, vol. 58, No. 9, Sep. 1968, "Coherent Interactions between Optical . . . ", pp. 1176-1183.

Shiffner et al., Applied Physics, vol. 23, No. 1, Sep. 1980, "Double-Core Single-Mode Optical Fiber as Directional Coupler", pp. 41-45.

Primary Examiner—William L. Sikes
Assistant Examiner—Frank González
Attorney, Agent, or Firm—Knobbe, Martens, Olson & Bear

[57] ABSTRACT

A passive, frequency selective, fiber optic multiplexer, comprises a directional coupler in which a pair of single mode optical fibers are accurately positioned to provide evanescent field coupling, typically by polishing a portion of the cladding from each of said fibers to place the respective cores of said fibers within the evanescent field of light in the other fiber. The coupling efficiency of a coupler constructed in this manner is wavelength dependent, and provides over-coupling, that is, the capability of transferring light, virtually entirely, back and forth between the fibers within the coupler. The wavelength dependent nature of the evanescent field coupling permits multiplexing, specifically between a pair of wavelengths, one of which is coupled in its entirety from a first fiber to a second fiber, and the other of which is essentially uncoupled. By increasing the number of total transfers of the light signals between the pair of fibers, the frequency resolution of the multiplexer may be optimized for light signals of virtually any frequency separation.

29 Claims, 37 Drawing Figures

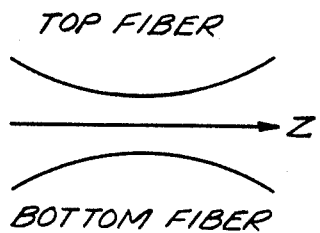
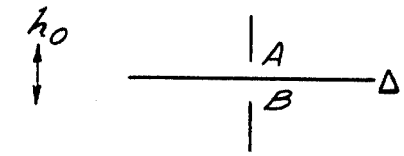
SUPERPOSED CONFIGURATION
*Fig. 14*  *Fig. 15*
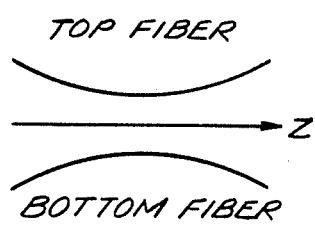
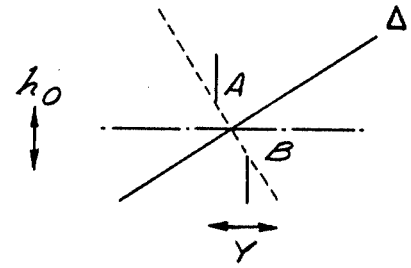
OFFSET CONFIGURATION
*Fig. 16*  *Fig. 17*
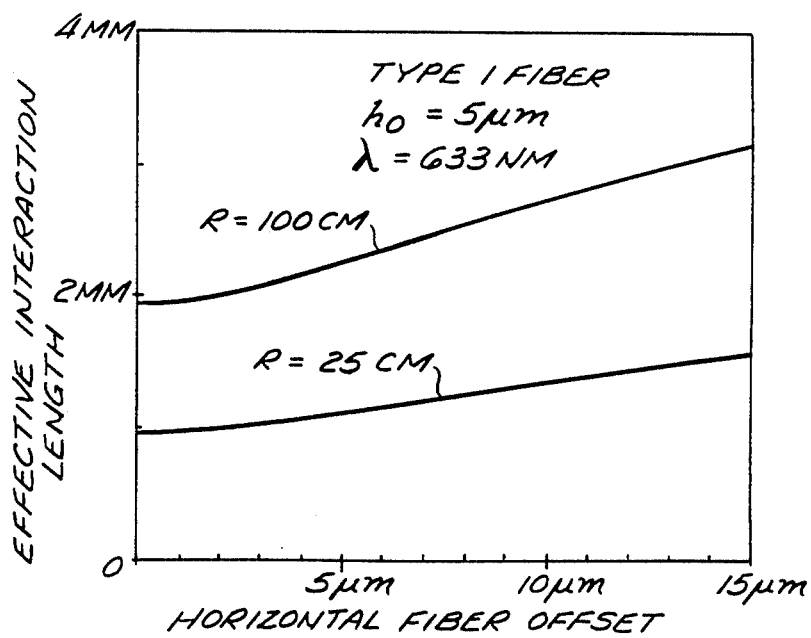
*Fig. 18*

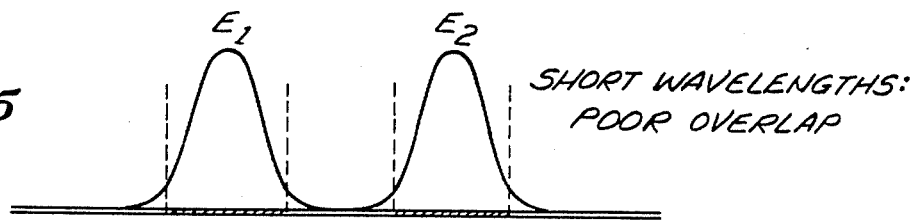
*Fig. 25* — SHORT WAVELENGTHS: POOR OVERLAP
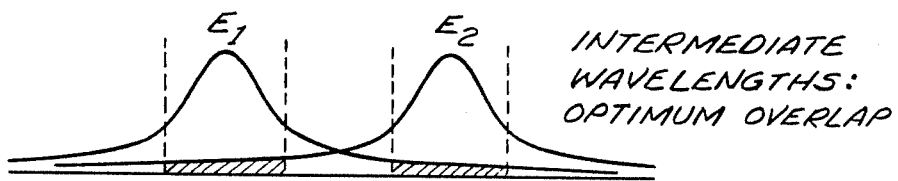
*Fig. 26* — INTERMEDIATE WAVELENGTHS: OPTIMUM OVERLAP
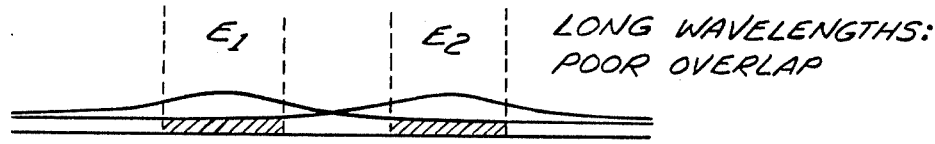
*Fig. 27* — LONG WAVELENGTHS: POOR OVERLAP
EVOLUTION OF THE E-FIELD OVERLAP
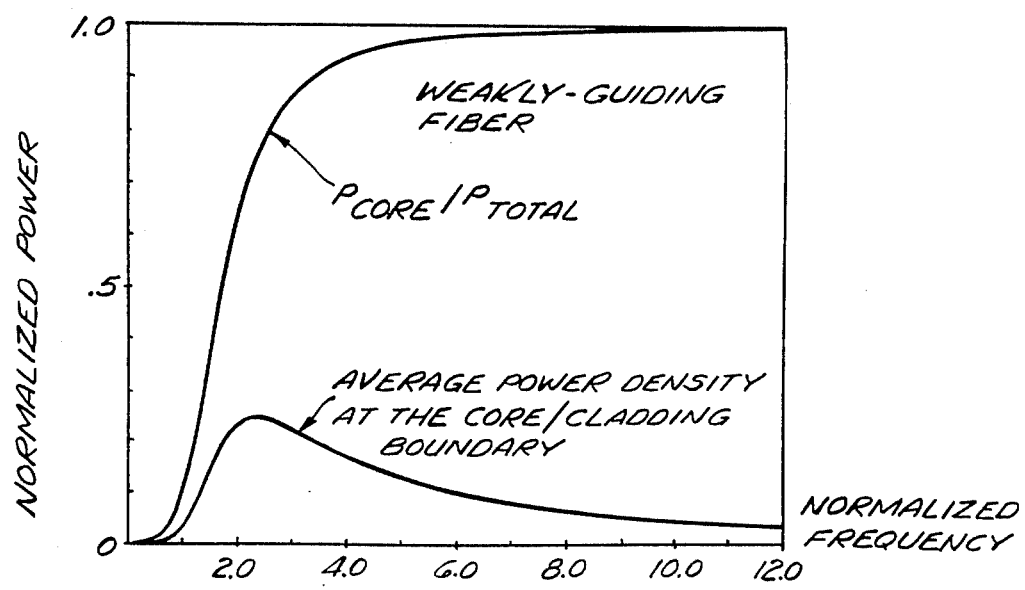
*Fig. 28*

SCHEMATIC OF WAVELENGTH MULTIPLEXER
USING A BI-DIRECTIONAL COUPLER

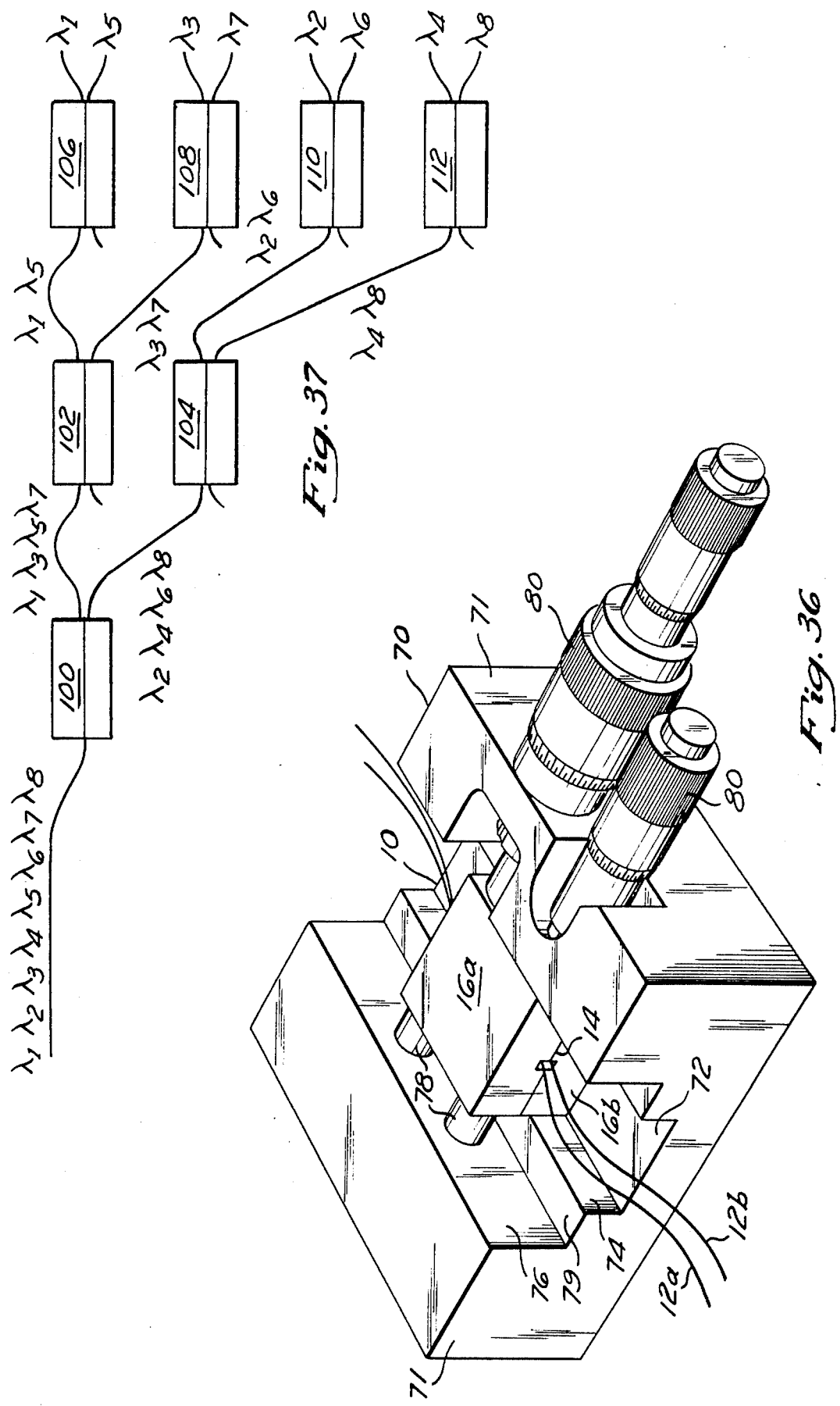

PASSIVE FIBER OPTIC MULTIPLEXER

BACKGROUND OF THE INVENTION

This invention relates to passive fiber optic multiplexers, and specifically to a wavelength responsive multiplexer useful for combining a plurality of signals of different light wavelengths carried by different optical fibers onto a single optical fiber, or for separating signals of different light wavelengths carried by a common optical fiber for continued transmission on a pair of optical fibers.

Fiber optic multiplexing, in the past, has been accomplished using active systems in which a pair of waveguides are surrounded by a crystal material which has a voltage responsive refractive index. Such active systems require the application of power, as well as careful tuning and adjustment during use, for proper functioning.

In addition to these active systems, passive frequency selective couplers have been devised, such as that described in U.S. Pat. No. 3,957,341, issued May 18, 1976, to Henry F. Taylor, in which the waveguides have different phase propagation constants at all frequencies except for the frequency to be coupled, yielding a separation of this frequency from all other frequencies. Such systems, however, require careful material selection for the desired frequency separation and do not lend themselves to adjustment during or after manufacture to accomplish the separation of optical signals over a broad range of frequencies.

While the frequency dependence of coupling light energy between two identical parallel dielectric waveguides has been theoretically predicted in a number of published scientific articles, such coupling of light energy in passive systems has generally been considered impractical for most applications, since the frequency selectivity has generally been considered relatively unpronounced, that is, such systems have generally been considered to yield only relatively poor resolution.

There exists, therefore, a need for a passive optical coupler which provides high resolution frequency selection and which is adjustable to provide such resolution for selected frequencies within a broad frequency band. Thus, in many optical systems, it is desirable that multiple signals be simultaneously transmitted on a single optical fiber at different optical frequencies, thus multiplying the transmission capability of the fiber. Multiplexers for use in such systems are preferably tunable, at least at the time of their manufacture, to permit the multiplexing or separation of different frequencies so that, at a particular point of use, a single one of the transmitted frequencies may be detected. It is desirable that such multiplexing be accomplished with the lowest possible throughput losses so that system efficiency will not be unduly limited by losses in the multiplexer.

SUMMARY OF THE INVENTION

The present invention provides a fiber optic multiplexer which is tunable during manufacture, and subsequently, to separate or combine virtually any group of optical frequencies. Unlike previous passive multiplexers, the present invention provides high resolution along with accurate tuning capability, to facilitate the manufacture of an optical multiplexer to meet the optical system's specifications, rather than placing restraints on the system due to multiplexer limitations, as has been necessary in the prior art.

The multiplexer of the present invention utilizes a single mode optical fiber coupler in which a pair of single mode fibers are positioned adjacent to one another through a selectable interaction length to permit evanescent field coupling, with over-coupling at selected frequencies. When cladded single mode fibers are utilized in the construction of the coupler, the fibers are mounted in a pair of bases or blocks having respective arcuate grooves for mounting the respective strands of fiber optic material. Material is removed by simultaneously polishing the blocks and the strands, until the desired amount of fiber optic material has been removed. The blocks are then positioned in a face-to-face relationship, with the strands positioned in close proximity to each other, and with the cutaway portions of the fiber in facing relationship.

In order to insure proper evanescent field coupling, the amount of material removed from the fibers must be carefully controlled, so that the spacing between the core portions of the fibers is within a predetermined "critical zone". This causes each strand to receive a significant portion of the evanescent field energy from the other strand, and coupling is achieved without significant energy loss.

The coupler used in the multiplexer of this invention may be adjusted so that the coupled power at a selected wavelength may be changed, through a predetermined range, to a desired value, without substantially affecting the throughput loss. Such coupler adjustment, or coupler tuning, may be accomplished by translating the fibers so that their respective facing surfaces are slidingly offset relative to one another.

An important feature of a coupler of this type is its capability of achieving low throughput losses. Experimental results show that throughput losses of 0.2 db have been attained, although losses of 0.5 db are more common. Furthermore, the coupler has a high directivity with substantially all of the coupled power being delivered to the output side of the coupler. Tests have shown that the directionally coupled power is greater than 60 db above the contradirectionally coupled power. The coupler also has an excellent polarization response, and will pass light of virtually any polarization equally well.

The radius of the arcuate grooves within the bases or blocks may be selected to provide a predetermined "interaction length". As used in this specification, "interaction length" means the length in the direction of the fiber axes through which the core of one fiber is positioned within the evanescent field of the other fiber.

The shape of the evanescent field in a single mode optical fiber is wavelength dependent. Thus, in a fiber optic coupler, the strength of the evanescent field of a first fiber, at the location of the core of a second fiber, depends upon the wavelength of the light transmitted by the first fiber. This fact yields a different coupling efficiency for different wavelengths within the fiber optic coupler and thus different "coupling lengths" for different light wavelengths. As used in this specification, "coupling length" defines a length parallel to the fiber axes within the "interaction length" required for 100 percent coupling of light of a given wavelength from one fiber to another. If the interaction length of a coupler at a predetermined wavelength is equal to the coupling length, the coupler will transfer virtually 100 percent of light from a first optical fiber to a second optical fiber. If, however, the interaction length at a predetermined wavelength is twice the coupling length, all of the light energy will be coupled from a first fiber to a second fiber and then coupled from the second fiber back to the first fiber to exit the coupler within the first fiber, yielding a net coupling efficiency of zero. From this description, it can be seen that, if the interaction length is an even multiple of the coupling length at a predetermined frequency, the coupling efficiency of the coupler will be zero. If, on the other hand, the interaction length is an odd multiple of the coupling length at a given frequency, the coupling efficiency of the coupler will be 100 percent.

Since the coupling length, as described above, is wavelength dependent, the overcoupling capability of the coupler and the even/odd multiple relationship described above permits the coupler to couple virtually none of the light of a first signal at a first wavelength, while coupling virtually all of the light of a second signal having a second wavelength.

Additionally, as the interaction length becomes a higher multiple of the coupling lengths of two wavelengths being separated, the resolution, or frequency discrimination capability, of the coupler increases. Thus, if X is the coupling length for a first wavelength, and Y is the coupling length for a second wavelength, and the even/odd multiple relationship exists, $NX = L$ and $(N+1)Y = L$, where L is the interaction length of the coupler and N is the even multiple of coupling lengths of the first wavelength within the interaction length L. Under these circumstances, $N+1$ is the odd multiple of coupling lengths of the second signal in this same interaction length L. In accordance with this definition, $X/Y = (N+1)/N$.

From this relationship, it can be seen that, as N increases, the proportional difference between the interaction lengths X and Y decreases, and thus the differential between the wavelengths of the two signals, one of which is to be coupled and one uncoupled, is reduced.

Thus, the interaction length L may be selected to provide a coupling multiple N which provides the frequency discrimination resolution required in a given system.

Plural multiplexers, constructed in accordance with the present invention, may be utilized in combination to separate large numbers of signals of different optical frequencies or to combine such signals onto a single fiber.

BRIEF DESCRIPTION OF THE DRAWINGS

These and other advantages of the present invention are best understood through reference to the drawings in which:

FIG. 14 is a schematic illustration showing the physical relationship in a first orthogonal direction of two superimposed fibers in a coupler;

FIG. 15 is a schematic diagram of the fibers of FIG. 14 taken in a direction orthogonal to that of FIG. 14;

FIG. 16 is a schematic illustration similar to FIG. 14 for offset fibers;

FIG. 17 is a schematic illustration similar to FIG. 15 for the offset fibers of FIG. 16;

FIG. 18 is a graph showing the effective interaction length of a coupler, according to the present invention, as a function of horizontal fiber offset for a pair of couplers having a minimum fiber spacing of 5 microns, at a wavelength of 633 nm, and radii of 25 and 100 centimeters;

FIG. 25 is a schematic illustration of the E field overlap between coupled fibers in the coupler of the present invention with short wavelengths;

FIG. 26 is similar to FIG. 25 and shows the E field overlap for intermediate wavelengths;

FIG. 27 is similar to FIGS. 25 and 26 and shows the E field overlap for long wavelengths;

FIG. 28 is a plot of average power density at the core/cladding boundary and core power/total power as a function of normalized frequency;

FIG. 36 is a perspective view of a tuning device having micrometers for adjusting the offset of the facing surfaces to tune the coupler to a desired coupling efficiency; and FIG. 37 is a schematic illustration of a multiple wavelength multiplexing system using the multiplexing coupler of the present invention.

DETAILED DESCRIPTION OF THE PREFERRED EMBODIMENT

Figure 1:
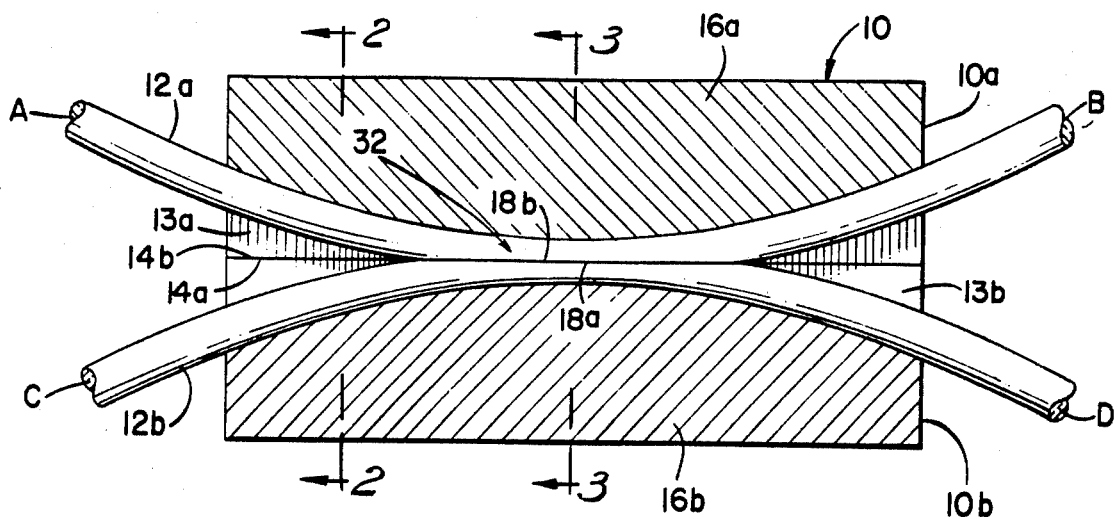
FIG. 1 is a cross-sectional view of the fiber optic coupler used as a multiplexer in the present invention, showing a pair of fiber optic strands mounted in respective arcuate grooves of respective bases.
Figure 2:
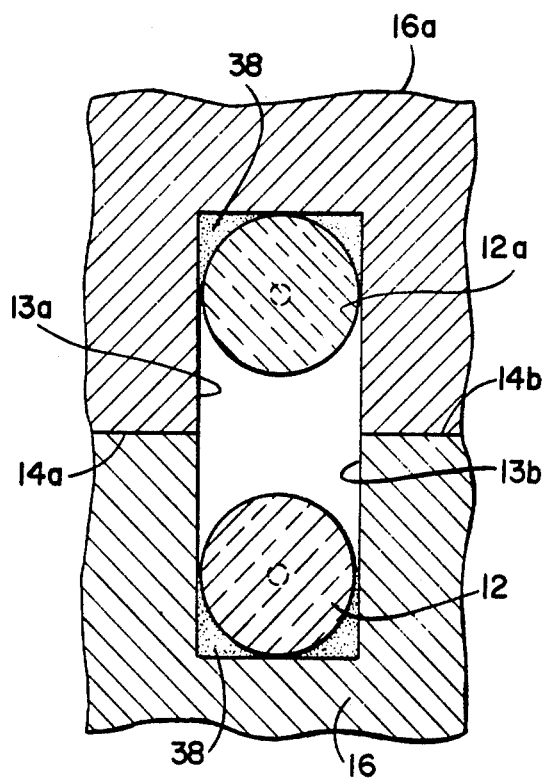
FIGS. 2 and 3 are cross-sectional views of the coupler of FIG. 1, taken along lines 2—2 and 3—3, respectively.
Figure 3:
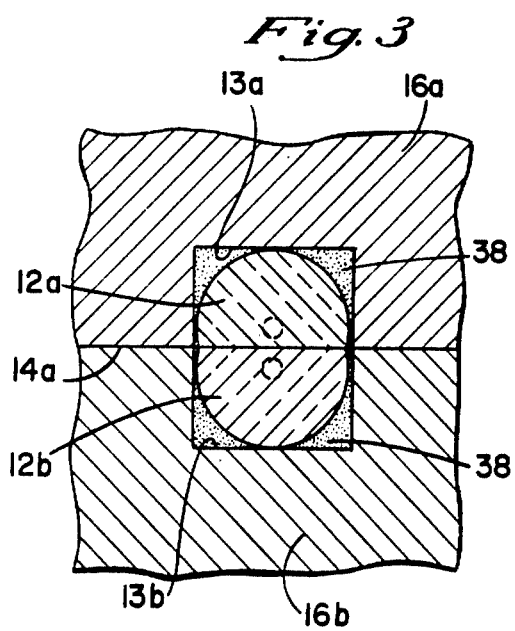
Figure 4:
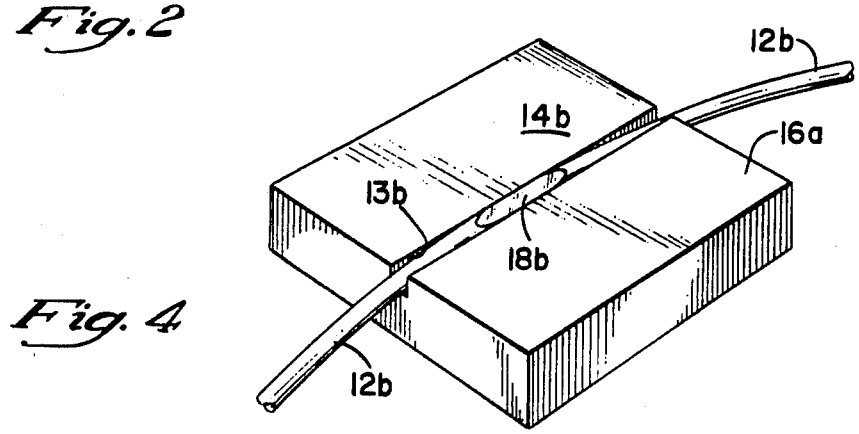
FIG. 4 is a perspective view of the lower base of the coupler of FIG. 1 separated from the other base to show its associated fiber mounting and the oval-shaped facing surface of the fiber.
Figure 5:
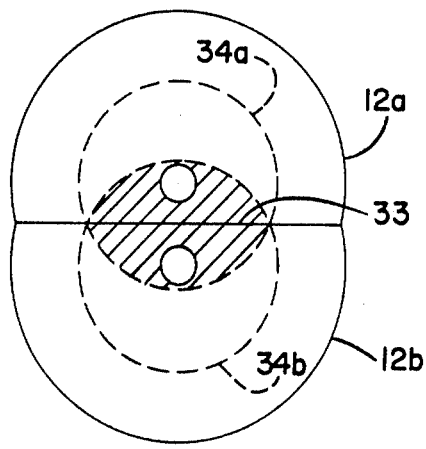
FIG. 5 is a schematic diagram showing the evanescent fields of the pair of fibers overlapping at the interaction region.

The fiber optic coupler, which is described below in reference to FIGS. 1 through 10, is disclosed and claimed in U.S. patent application Ser. No. 300,955, entitled "FIBER OPTIC DIRECTIONAL COUPLER", filed Sept. 10, 1981, by Herbert J. Shaw and Ralph A. Bergh, and assigned to the assignee of the present invention.

As illustrated in FIGS. 1 to 4, the coupler 10 of the present invention includes two strands 12A and 12B of a single mode fiber optic material mounted in longitudinal arcuate grooves 13A and 13B, respectively, formed in optically flat, confronting surfaces 14A and 14B, respectively, of rectangular bases or blocks 16A and 16B, respectively. The block 16A with the strand 12A mounted in the groove 13A will be referred to as the coupler half 10A, and the block 16B with the strand 12B mounted in the groove 13B will be referred to as the coupler half 10B.

Each of the strands 12A and 12B comprise a commercially available fiber of quartz glass which is doped to have a central core and an outer cladding. The strands 12A and 12B are single mode fibers, which typically have a core diameter on the order of 10 microns or less and a cladding diameter on the order of 125 microns. In the embodiment disclosed, the diameter of the strands 12 and their respective cores are exaggerated.

The arcuate grooves 13A and 13B have a radius of curvature which is very large compared to the diameter of the fibers 12, and have a width slightly larger than the fiber diameter to permit the fibers 12, when mounted therein, to conform a path defined by the bottom walls of the grooves 13. The depth of the grooves 13A and 13B varies from a minimum at the center of the blocks 16A and 16B, respectively, to a maximum at the edges of the blocks 16A and 16B, respectively. This advantageously permits the fiber optic strands 12A and 12B, when mounted in the grooves 13A and 13B, respectively, to gradually converge toward the center and diverge toward the edges of the blocks 16A, 16B, thereby eliminating any sharp bends or abrupt changes in direction of the fibers 12 which may cause power loss through mode perturbation. In the embodiment shown, the grooves 13 are illustrated as being rectangular in cross-section, however, it will be understood that other suitable cross-sectional contours which will accommodate the fibers 12 may be used alternatively, such as a U-shaped cross-section or a V-shaped cross-section.

At the centers of the blocks 16, in the embodiment shown, the depth of the grooves 13 which mount the strands 12 is less than the diameter of the strands 12, while at the edges of the blocks 16, the depth of the grooves 13 is preferably at least as great as the diameter of the strands 12. Fiber optic material was removed from each of the strands 12A and 12B to form the respective oval-shaped planar surfaces 18A, 18B, which are coplanar with the confronting surfaces 17A, 17B, respectively. These surfaces 18A, 18B will be referred to herein as the fiber "facing surfaces". Thus, the amount of fiber optic material removed increases gradually from zero towards the edges of the block 16 to a maximum towards the center of the block 16. This tapered removal of the fiber optic material enables the fibers to converge and diverge gradually, which is advantageous for avoiding backward reflection and excess loss of light energy.

In the embodiment shown, the coupler halves 10A and 10B are identical, and are assembled by placing the confronting surfaces 14A and 14B of the blocks 16A and 16B together, so that the facing surfaces 18A and 18B of the strands 12A and 12B are in facing relationship.

An index matching substance (not shown), such as index matching oil, is provided between the confronting surfaces 14. This substance has a refractive index approximately equal to the refractive index of the cladding, and also functions to prevent the optically flat surfaces 14 from becoming permanently locked together. The oil is introduced between the blocks 16 by capillary action.

An interaction region 32 is formed at the junction of the strands 12, in which light is transferred between the strands by evanescent field coupling. It has been found that, to insure proper evanescent field coupling, the amount of material removed from the fibers 12 must be carefully controlled so that the spacing between the core portions of the strands 12 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 12 is within the critical zone, each strand receives a significant portion of the evanescent field energy from the other strand, and good coupling is achieved without significant energy loss. The critical zone is illustrated schematically in FIG. 5 as including that area, designated by the reference numeral 33, in which the evanescent fields, designated by reference numerals 34A and 34B, of the fibers 12A and 12B, respectively, overlap with sufficient strength to provide coupling, i.e., each core is within the evanescent field of the other. However, as previously indicated, mode perturbation occurs within the area 33 when the cores are brought too close together. For example, it is believed that, for weakly guided modes, such as the $HE_{11}$ mode in single mode fibers, such mode perturbation begins to occur when sufficient material is removed from the fibers 12 to expose their cores. Thus, the critical zone is defined as that area in which the evanescent fields 34 overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown in FIGS. 1-4, for example, the required center-to-center spacing between the strands 12 at the center of the coupler is typically less than a few (e.g., 2-3) core diameters.

Preferably, the strands 12A and 12B are (1) identical to each other, (2) have the same radius of curvature at the interaction region 32, and (3) have an equal amount of fiber optic material removed therefrom to form their respective facing surfaces 18A and 18B. Thus, the fibers 12 are symmetrical, through the interaction region 32, in the plane of the facing surfaces 18, so that the facing surfaces 18 are coextensive if superimposed. This insures that the two fibers 12A and 12B will have the same propagation characteristics at the interaction region 32, and thereby avoids coupling attenuation associated with dissimilar propagation characteristics.

The blocks or bases 12 may be fabricated of any suitable rigid material. In one presently preferred embodiment, the bases 12 comprise generally rectangular blocks of fused quartz glass approximately 1 inch long, 1 inch wide, and 0.4 inch thick. In this embodiment, the fiber optic strands 12 are secured in the slots 13 by suitable cement 38, such as epoxy glue. One advantage of the fused quartz blocks 16 is that they have a coefficient of thermal expansion similar to that of glass fibers, and this advantage is particularly important if the blocks 16 and fibers 12 are subjected to any heat treatment during the manufacturing process. Another suitable material for the block 16 is silicon, which also has excellent thermal properties for this application.

Operation of the Coupler 10

The coupler 10 includes four ports, labeled A, B, C, and D in FIG. 1. When viewed from the perspective of FIG. 1, ports A and C, which correspond to strands 12A and 12B, respectively, are on the left-hand side of the coupler 10, while the ports B and D, which correspond to the strands 12A and 12B, respectively, are on the right-hand side of the coupler 10. For the purposes of discussion, it will be assumed that input light is applied to port A. This light passes through the coupler and is output at port B and/or port D, depending upon the amount of power that is coupled between the strands 12. In this regard, the term "normalized coupled power" is defined as the ratio of the coupled power to the total output power. In the above example, the normalized coupled power would be equal to the ratio of the power at port D to the sum of the power output at ports B and D. This ratio is also referred to as the "coupling efficiency", and when so used is typically expressed as a percent. Thus, when the term "normalized coupled power" is used herein, it should be understood that the corresponding coupling efficiency is equal to the normalized coupled power times 100. In this regard, tests have shown that the coupler 10 has a coupling efficiency of up to 100%. However, it will also be seen that the coupler 10 may be "tuned" to adjust the coupling efficiency to any desired value between zero and the maximum.

Furthermore, the coupler 10 is highly directional, with substantially all of the power applied at one side of the coupler being delivered to the other side of the coupler. The coupler directivity is defined as the ratio of the power at port D to the power at port C, with the input applied to port A. Tests have shown that the directionally coupled power (at port D) is greater than 60 db above the contra-directionally coupled power (at port C). Further, the coupler directivity is symmetrical. That is, the coupler operates with the same characteristics regardless of which side of the coupler is the input side and which side is the output side. Moreover, the coupler 10 achieves these results with very low throughput losses. The throughput loss is defined as the ratio of the total output power (ports B and D) to the input power (port A) subtracted from one (i.e., $1-(P_B+P_D)/P_A$). Experimental results show that throughput losses of 0.2 db have been obtained, although losses of 0.5 db are more common. Moreover, these tests indicate that the coupler 10 operates substantially independently of the polarization of the input light applied.

The coupler 10 operates on evanescent field coupling principles in which guided modes of the strands 12 interact, through their evanescent fields, to cause light to be transferred between the strands 12. As previously indicated, this transfer of light occurs at the interaction region 32. The amount of light transferred is dependent upon the proximity and orientation of the cores, as well as the effective length of the interaction region 32. As will be described in detail below, the amount of light transferred is also dependent of the wavelength of the light. The length of the interaction region 32 is, in turn, dependent upon the radius of curvature of the fibers 12, and, to a limited extent, the core spacing, although it has been found that the effective length of the interaction region 32 is substantially independent of core spacing. As will be explained in more detail below, however, the coupling length is a function of core spacing, as well as wavelength. In one exemplary embodiment, employing an edge-to-edge core spacing of about 1.4 microns, and a radius of curvature on the order of 25 centimeters, the effective interaction region is approximately one millimeter long at a light signal wavelength of 633 nm. Because the coupling length at 633 nm is also one millimeter in such a coupler, the light makes only one transfer between the strands 12 as it travels through the interaction region 32. However, if the length of the interaction region 32 is increased, or core spacing decreased, a phenomenon referred to herein as "overcoupling" will occur, since the coupling length is shorter than the effective interaction length. Under these circumstances, the light will transfer back to the strand from which it originated. As the interaction length is further increased, and/or the core spacing further decreased, the effective interaction length becomes a greater multiple of the coupling length, and the light transfers back to the other strand. Thus, the light may make multiple transfers back and forth between the two strands 12 as it travels through the region 32, the number of such transfers being dependent on the length of the interaction region 32, the light wavelength (as described below), and the core spacing.

Effective Interaction Length

Figure 6:
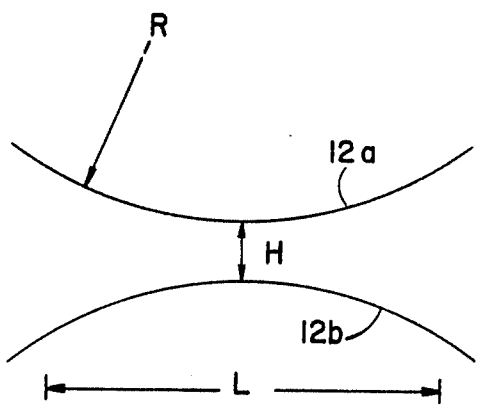
FIG. 6 is a schematic drawing of the coupler of FIG. 1 illustrating the radius of curvature, core spacing, and interaction length, as parameters of the coupler.

The foregoing may be more fully understood through reference to FIG. 6 which shows a schematic representation of the coupler 10 of FIG. 1. The cores of fibers 12A and 12B are shown as gradually converging to a minimum spacing, labeled H, at the center of the coupler and diverging towards the edges of the coupler. The effective interaction length is labeled L and the radius of curvature of the strands 12A and 12B is labeled R. As indicated above, it has been found that, while the effective interaction length L is a function of the radius of curvature R, it is substantially independent of the minimum spacing H between the fibers 12. Although this independence is truly valid only for relatively large core spacings and short wavelengths, it provides a good approximation fo most applications, and thus, it advantageously permits the coupler, illustrated in FIG. 6, to be analyzed as an "equivalent" coupler comprising two parallel waveguides, separated through an interaction length L (equal to the effective interaction length L of the coupler of FIG. 6), by a spacing H equal to the spacing H of FIG. 6, as shown in FIG. 7.

Figure 7:
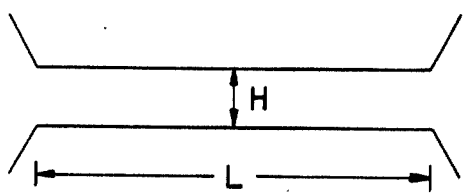
FIG. 7 is a schematic drawing of an "equivalent" coupler.
Figure 8:
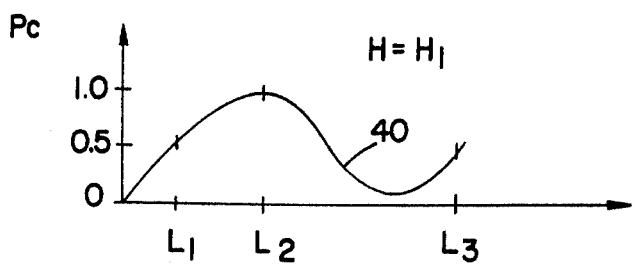
FIG. 8 is a graph of normalized coupled power for a light signal of a given wavelength as a function of interaction length for a given fiber core spacing.
Figure 9:
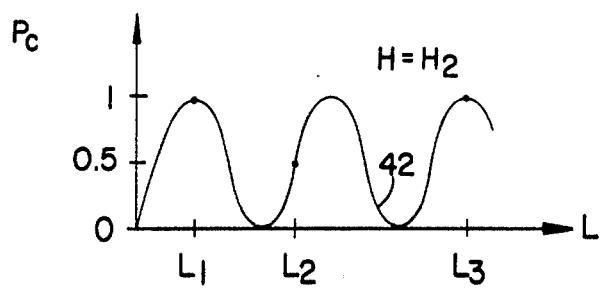
FIG. 9 is a graph of normalized coupled power for light signals of wavelengths identical to that of FIG. 8 as a function of interaction length for another fiber core spacing.

The effects of varying either the interaction length L or the fiber spacing H of the "equivalent" coupler shown in FIG. 7 may be understood through reference to FIGS. 8 and 9. FIG. 8 shows a sinusoidal curve 40 whil illustrates that the coupled power $P_C$ varies sinusoidally as a function of the interaction length L for a given fiber spacing H1 and a given wavelength. At this fiber spacing, it may be seen that the coupler power is approximately 50% when the interaction length is equal to L1, and increases to 100% when the interaction length increases to L2. In accordance with the definition given above, L2 equals the coupling length for this given wavelength. If the interaction length is further increased, so that it is longer than the coupling length, "overcoupling" results, in which light is transferred back to the strand from which it originated, and the coupled power $P_C$ begins to decrease towards zero. The coupled power then increases from zero to, for example, 50% at L3. Thus, it may be seen that the amount of coupling may be varied by changing the length L of the interaction region of the "equivalent coupler" of FIG. 7.

The effect of decreasing the spacing H between the fibers of this "equivalent coupler" is to increase the strength of the coupling, and thus, increase the amount of light transferred over a given interaction length L, as shown by comparing the sinusoidal curve 42 of FIG. 9 with the sinusoidal curve of FIG. 8. For example, if the fiber spacing were decreased from $H_1$ (FIG. 8) to $H_2$ (FIG. 9), the coupled power may be 100% at interaction length L1 in FIG. 9, as compared to 50% for the same interaction length L1 in FIG. 8. Thus, this change in spacing effectively reduces the coupling length for the given wavelength from L2 (FIG. 8) to L1 (FIG. 9). The curve 42 then begins to demonstrate overcoupling and the coupled power decreases to 50% at interaction length L2. At interaction length L3, which is an odd multiple of the coupling length L1 (5 times), the curve 42 indicates that the coupled power is again 100%. Thus, for a given interaction length (e.g., L1, L2, or L3), in the "equivalent coupler" of FIG. 7, and light wavelength, the coupling length may be adjusted by changing the fiber core spacing.

Figure 10:
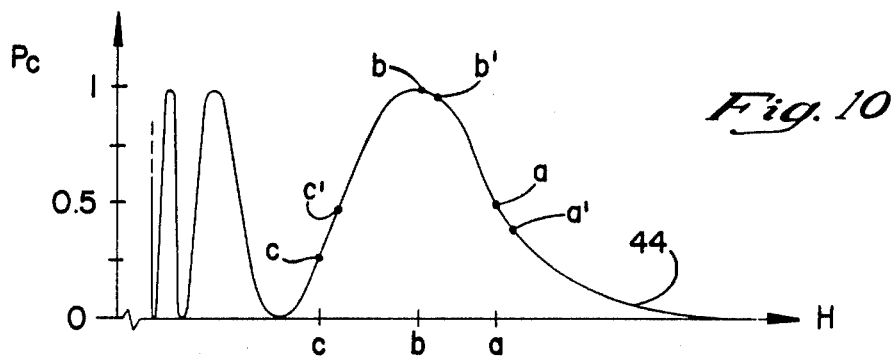
FIG. 10 is a graph of normalized coupled power for light of a given wavelength as a function of minimum fiber core spacing (spacing surfaces superimposed)

The relationship between the minimum fiber spacing H and the coupled power $P_C$ for a given interaction length L of the "equivalent coupler" of FIG. 7 and a given light wavelength is illustrated in FIG. 10 by the curve 44. As shown in this figure, the normalized coupled power oscillates between 0 and 1 with increasing frequency as the coupling length is shortened by decreasing the core spacing H. The reference points a, b, and c on the curve H were chosen somewhat arbitrarily to indicate normalized coupled power of 0.5, 1.0, and 0.25, respectively. It will be recognized that at point "a", 50% of the power is coupled from one fiber to the other. At point "b", full coupling is achieved, and 100% of the optical power is transferred between the strands. Point "c", on the other hand, represents an overcoupled condition wherein the coupled power has decreased from full coupling to 25%.

As stated previously, the interaction length of the coupler, shown schematically in FIG. 6, is most advantageously analyzed through the use of an "equivalent coupler", shown in FIG. 7, wherein the minimum spacing H is identical to the minimum spacing H of the actual fiber, but the "effective interaction length" of the actual fiber of FIG. 6 is equal to the actual interaction length of the "equivalent coupler" of FIG. 7. The "effective interaction length" of the coupler of FIG. 6 in this analysis is a complex function which depends primarily on the radius of curvature R of the actual coupler. This analysis involves the integration of the coupling coefficient in both directions from the point of minimum spacing, in the direction of the axis of the fibers, with the coupling coefficient varying in accordance with the varying spacing of the fibers. This varying spacing for superimposed curved fibers is given by the following equation: $H(Z) = H_0 + Z^2/2R$ where R is the curvature radius of the fibers from the point of minimum spacing, and $H_0$ is the minimum spacing distance.

Figure 11:
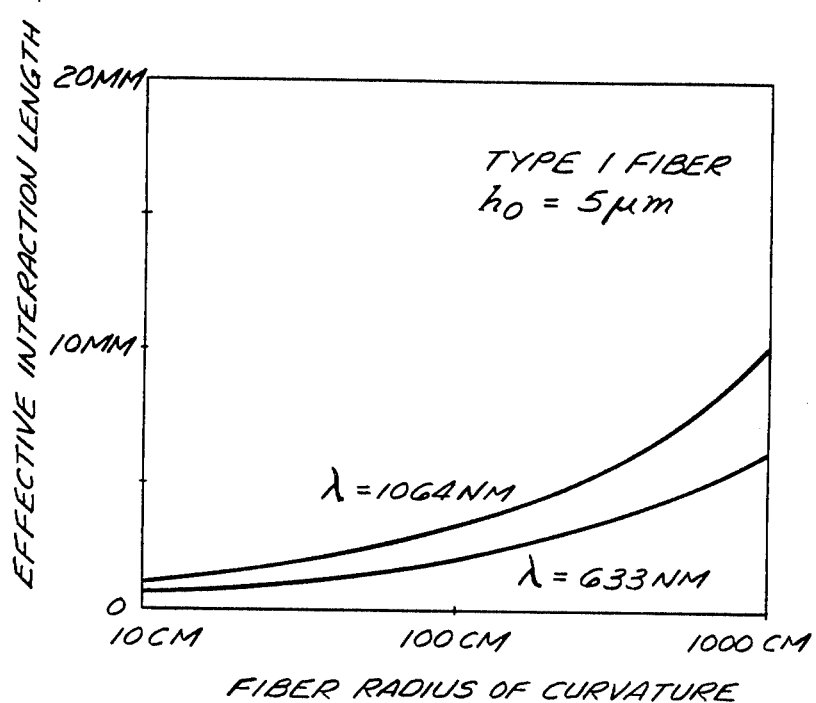
FIG. 11 is a graph of effective interaction length versus fiber radius of curvature for a coupler having a minimum spacing of 5 microns.

From this analysis, a typical dependence of the coupler "effective interaction length" on fiber radius of curvature R is shown in FIG. 11 for a broad range of signal wavelengths. As expected, the interaction length increases with increasing radius of curvature. As an approximation, valid for situations where the minimum fiber spacing $H_0$ is large in comparison with the fiber radius, a, and for large values of v (signal frequency), i.e., short signal wavelengths, the value of L, interaction length, is:

$$L = (R)^{\frac{1}{2}} (v/\pi a + \frac{1}{2} H_0)^{-\frac{1}{2}}$$

From this expression, it can be seen that the interaction length L is expected to increase with $(R)^{\frac{1}{2}}$. This result is shown in FIG. 11. An increase of the radius R by a factor of 4 doubles the effective interaction length.

As previously stated, the effective interaction length L can be considered as independent of the minimum fiber spacing H of FIG. 6.

Of importance to the use of this coupler as a multiplexer, is the dependence of the effective interaction length L (FIG. 6) on signal wavelengths, specified by the approximate expression for L provided above. If the value $\gamma$ is the penetration depth of the evanescent field of the unperturbed fiber mode inside the fiber cladding, then $\gamma = v/a$. The expression given above for interaction length shows that this length should increase with wavelength, since longer signal wavelengths penetrate deeper into the fiber cladding.

Figure 12:
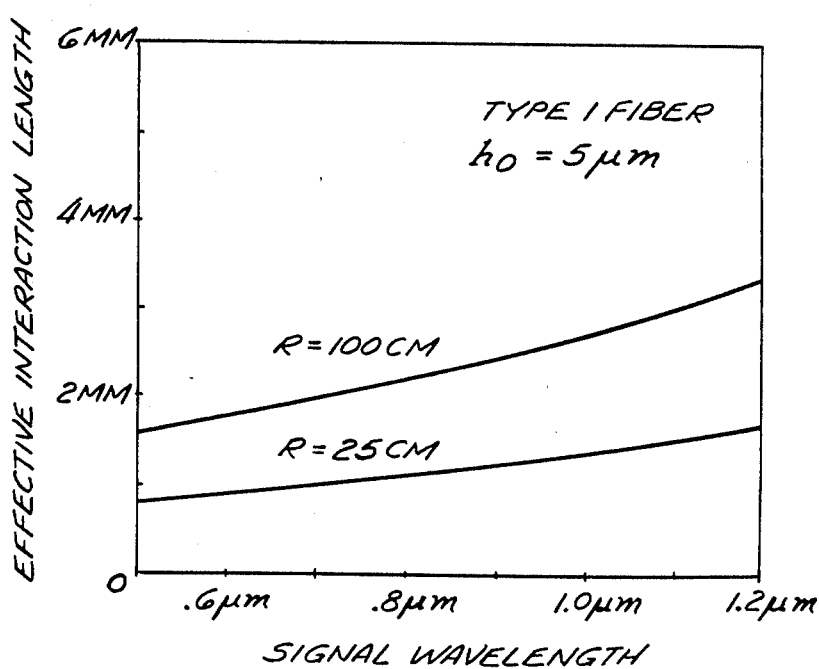
FIG. 12 is a graph of effective interaction length as a function of signal wavelength for a pair of couplers having a minimum separation of 5 microns and fiber curvature radii of 25 and 100 centimeters.

The effect of signal wavelengths on effective interaction lengths (FIG. 6) is illustrated in FIG. 12. In this figure, the interaction length is seen to increase more or less linearly with increasing wavelengths.

The foregoing concepts are useful in understanding the "tunability" aspects of the coupler 10. As used herein, the term "tuning" is defined as translating the fibers 12 relative to each other to adjust the power coupled therebetween. Such translation of the fibers 12 is accomplished by sliding the planar facing surfaces 18 relative to each other, so that they are offset, rather than superimposed. That is, the fibers 12 are mutually displaced in the plane of the planar facing surfaces. Viewed another way, such translation occurs when respective planes in which each of the fibers lie, are displaced relative to each other.

Figure 13:
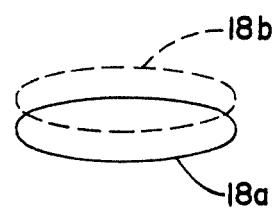
FIG. 13 is a schematic representation of the oval-shaped surfaces of the fibers after polishing, showing the facing surfaces laterally offset.

In one presently preferred method of fiber translation, the facing surfaces 18 are offset laterally. As used herein, the term "laterally offset" means sliding the facing surfaces 18 laterally from their superimposed position to increase the spacing between the fiber cores, while maintaining a substantially parallel relationship between the fibers 12. Such lateral offset of the facing surfaces 18 is illustrated schematically in FIG. 13. The effect of such lateral offset is, of course, to change the spacing between the cores of the fibers 12. However, in addition to this change of spacing, the interaction length is also effected. The expression $H(Z) = H_0 + Z^2/2R$ was provided as a definition of the varying spacing for superimposed curved fibers. When such fibers are laterally offset, this expression becomes more complex. FIGS. 14 and 15 schematically represents two views (parallel and perpendicular to the fiber plane) for a superimposed configuration analyzed previously. In an offset configuration, shown in FIGS. 16 and 17, the minimum fiber spacing becomes $(H_0^2 + Y^2)^{\frac{1}{2}}$, whereby Y is the lateral offset, but also the direction of this minimum spacing, shown by the dashed line in FIG. 17, no longer lies in the plane of the fibers. A new axis, $\Delta$, shown in FIG. 17, is skewed relative this plane. When viewed from the direction of this $\Delta$ axis, the fiber curvature changes, and the projected radius of curvature is larger than that of the real radius R. Thus, the spacing H(Z) between the fibers does not increase along the Z axis as fast as in the superimposed configuration when both configurations have the same minimum spacing. Thus, the expression given above for H(Z) in this offset configuration becomes $H(Z) = ((H_0 + Z^2/R)^2 + Y^2)^{\frac{1}{2}}$.

A direct verification of this anticipated behavior can be achieved by calculating the coupler interaction length versus fiber offset Y. FIG. 18 shows that, with increasing fiber offset, the coupler interaction length increases.

From the above description, it can be seen that the effective interaction length L (FIG. 6) at a given signal wavelength is found to depend primarily on the radius of curvature of the fibers. The dependence on minimum fiber spacing H is, for all practical purposes, negligible. Since signals with different wavelengths have different penetration depths into the cladding, there is a dependence of interaction length on signal wavelengths, in that the interaction length increases with increasing wavelengths. In addition, the geometry of the curved fiber coupler induces an increase in the effective radius of curvature of each fiber and thereby the interaction length with increasing lateral offset of the fibers. The important conclusion from this description is that for a given fiber type and signal wavelength, the effective interaction length between the curved fibers of FIG. 6 in a superimposed configuration is set at fabrication by the choice of a fiber radius of curvature R.

Figure 19:
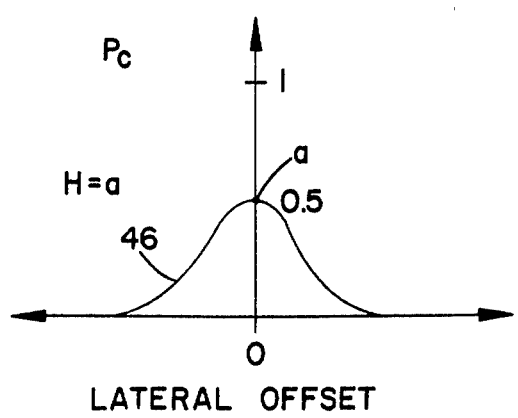
FIG. 19 is a graph of normalized coupled power as a function of lateral offset for a first minimum fiber core spacing.

The curve 46 of FIG. 19 graphically illustrates the effect of laterally offsetting the fiber facing surfaces 18 for a coupler having a minimum edge-to-edge core spacing H equal to "a" (FIG. 10) and a given wavelength light. When the facing surfaces 18 of the fibers are superimposed (i.e., no offset), the normalized coupled power will be equal to 0.5, as required by the curve 44 of FIG. 10. However, when the facing surfaces 18 of the fibers 12 are laterally offset in either direction to increase the spacing between the cores, the coupled power gradually decreases to zero.

Figure 20:
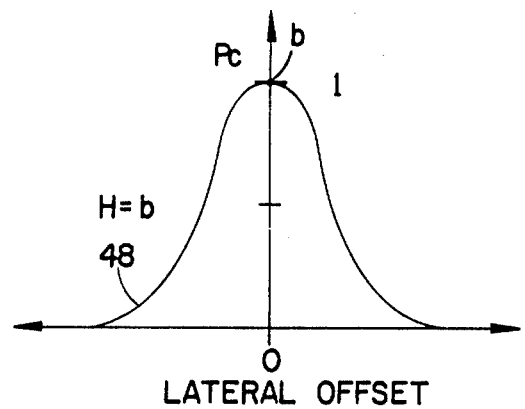
FIG. 20 is a graph of normalized coupled power as a function of lateral offset for a second fiber core spacing.

Referring now to the curve 48 of FIG. 20, the effect of lateral fiber offset upon normalized coupled power for a coupler having an edge-to-edge core spacing equal to "b" (FIG. 10) and the same light wavelength is shown. When there is no offset and the facing surfaces 18 are superimposed, the normalized coupled power is 1.0, as required by the curve 44 of FIG. 10, however, as the facing surfaces 18 of the fibers 12 are laterally offset in either direction, the coupled power gradually decreases.

Figure 21:
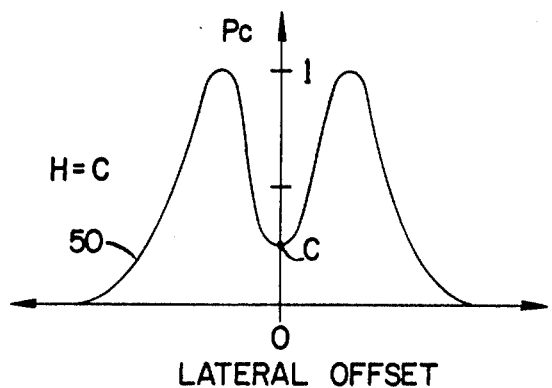
FIG. 21 is a graph of normalized coupled power as a function of lateral offset for a third fiber core spacing.

The curve 50 of FIG. 21 shows coupled power as a function of relative fiber offset for a core spacing equal to "c" (FIG. 10) and the same light wavelength, which, as will be recalled, represents an overcoupled condition. (i.e., the effective interaction length, exceeds the coupling length.) From this curve 50, it may be seen that, when the facing surfaces 18 of the fibers 12 are superimposed, the normalized coupled power is 0.25. As the core spacing is increased by sliding the facing surfaces 18 so that they are laterally offset, the normalized coupled power initially increases to 1.0 as the effective interaction length decreases to equal the coupling length, and then decreases toward zero when the core spacing is further increased.

In all of the foregoing cases illustrated by FIGS. 19, 20, and 21, the coupled power decreases to zero at substantially the same lateral offset, assuming that the physical parameters and light wavelengths corresponding to these figures are identical except for their fiber spacing at zero offset. By comparing the curves 46, 48, and 50 of the FIGS. 19, 20, and 21, respectively, it may be seen that the respective slopes of these curves tend to increase as the core spacing decreases. Thus, the sensitivity of the coupler to lateral offset is higher for a coupler having the characteristics shown in FIG. 21 than couplers having the characteristics shown in either FIG. 19 or 20.

THROUGHPUT LOSS

Figure 22:
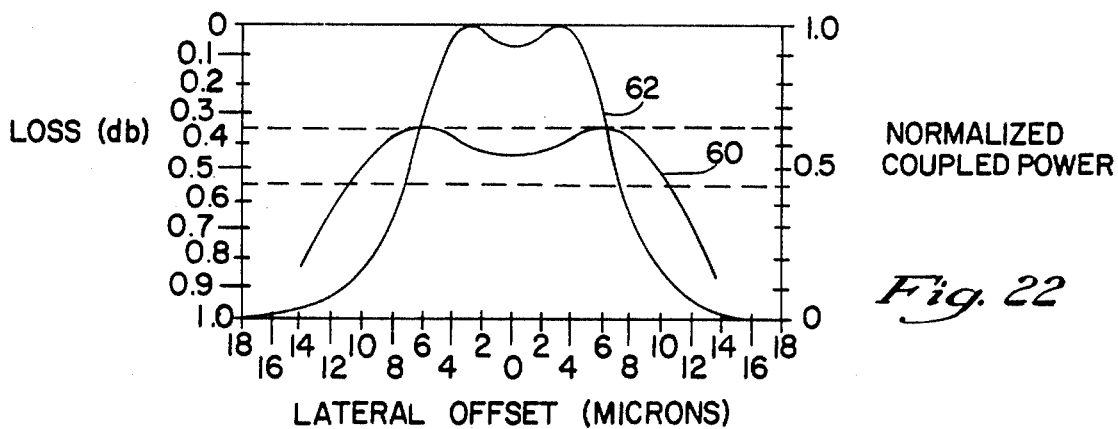
FIG. 22 is a graph of (a) normalized coupled power as a function of lateral offset and (b) throughput loss as a function of lateral offset for one exemplary coupler showing that the throughput loss is substantially constant over substantially the entire range of normalized coupled power.

Experimental evidence indicates that the throughput losses of the coupler 10 are substantially constant, except when the lateral offset of the cores is relatively large. Tests on one exemplary coupler showed that the throughput loss was within 0.2 dB of the minimum loss for a lateral offset of up to 10 microns in either direction. This coupler utilized a single mode fiber having a core index of 1.460, a cladding index of 1.4559, and a core diameter of 4 microns. The radius of curvature of the fibers was 25 centimeters, the edge-to-edge core spacing was approximately 0.9 microns, and the wavelength of the light utilized was 632.8 nm. FIG. 22 shows, for this exemplary coupler, a graph of throughput loss, designated by the reference numeral 60, and a graph of the normalized coupler power, designed by the reference numeral 62, both as a function of lateral offset of the facing surfaces 18. The two horizontal broken lines drawn through the center of FIG. 14 provide the upper and lower boundaries of an 0.2 db power loss band. It may be seen that the power loss curve 60 is within this band for lateral offsets up to about 12 microns in either direction. Further, it may be seen that, at a 12-micron lateral offset, the normalized coupled power is approximately 0.1. Thus, for coupled power 0.1 and 1, the power loss is within about 0.2 db of the minimum power loss. If the power loss band is expanded to 0.5 db, the power loss band is within the 0.5-db band for fiber offsets of up to 15 microns, which corresponds to a coupled power of less than 0.05 (i.e., 5%). Thus, this coupler exhibits substantially constant throughput losses, i.e., within a relatively narrow power loss band width, throughout substantially the entire operating range of the device. Further, it is significant that the throughput losses are very low, and relatively constant for coupled power between 10% and 100%.

Tests results show that throughput losses as low as about 0.2 dB have been attained, although losses of 0.5 dB are more common, as in the above-described exemplary examples.

Figure 23:
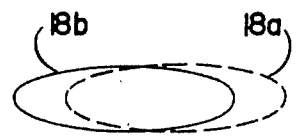
FIG. 23 is a schematic representation of the facing surfaces of the fiber, showing the facing surfaces longitudinally offset.

Since the coupling losses are relatively insensitive to lateral offset of the facing surfaces 18 throughout substantially the entire range of coupling efficiency, such lateral offset is a particularly advantageous method for tuning the coupler 10 to provide a desired amount of coupled power. However, it should be understood that the coupler characteristics may be changed by longitudinally offsetting the facing surfaces. The term, "longitudinal offsetting", as used in this sense, refers to translating the facing surfaces 18 from a superimposed position to an offset position in a direction parallel to the fibers 12, as illustrated schematically in FIG. 23. Such longitudinal offset, in effect, increases the minimum core spacing of the fibers 12. For example, referring back to FIG. 10, if it is assumed that the fiber spacing H, when the facing surfaces 18 are superimposed is equal to "a", longitudinally offsetting the facing surfaces 18 will translate this point "a" along the curve 44 to a point labeled "a'". Similarly, this longitudinal offset will translate the point "b" along the curve 44 to "b'" and the point "c" along the curve 44 to "c'". This, of course, will produce corresponding changes in the offset curves of FIGS. 19, 20 and 21 by reducing the normalized coupled power at zero offset.

Experiments have shown that it requires a relatively large longitudinal offset to produce changes in coupling equivalent to those achieved by comparatively small lateral offsets. Thus, the coupler is comparatively insensitive to longitudinal offsets. In addition, it has been found that, since throughput losses are not affected significantly by longitudinal offsets, alignment of the facing surface 18 is not critical.

Figure 24:
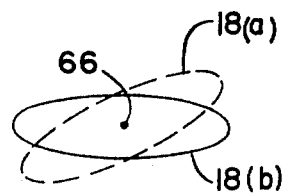
FIG. 24 is a schematic representation of the facing surfaces of the fibers, showing these facing surfaces rotationally offset.

The coupling characteristics of the coupler 10 may also be affected by rotating the facing surfaces 18 relative to each other, as this decreases the effective length of the interaction region. The term "rotationally offsetting" will be used to refer to translating the fibers, as illustrated schematically in FIG. 24, by rotating the facing surfaces 18 about a common axis, e.g., the axis 66. The effect of such rotational offsetting is similar to that described above for longitudinally offsetting the surfaces. That is, the coupler 10 is relatively insensitive to small rotational offsets, both in terms of changes in coupled power, as well as in throughput losses.

Thus, while minor adjustments to the coupled power may be provided by rotationally offsetting or longitudinally offsetting the facing surfaces, primary adjustments in coupled power are typically made by laterally offsetting the facing surfaces 18, although it will be understood that, in practice, a combination of these techniques may be utilized.

Coupling Length

As previously stated, the coupling length within the coupler 10 is the length required for light of a given wavelength to transfer completely from one fiber 12 to the other fiber 12. As was described, particularly in reference to FIGS. 8, 9 and 10, the coupling length is directly affected by the minimum fiber spacing H (FIG. 6). In addition, it has been found that a coupling length is a function of the light wavelength. As described above, the penetration depth of the evanescent field of the unperturbed fiber mode inside the fiber cladding increases with increased wavelength.

This phenomenon is shown graphically in FIGS. 25, 26, and 27 which show the magnitude of the evanescent field for each of two closely spaced optical fibers. At short wavelengths, as depicted in FIG. 25, a poor overlap exists between the evanescent fields E1 and E2 because the evanescent fields at such wavelengths are mostly confined near the fiber core (depicted by the broken lines), that is, the modes are well guided and well confined in the respective waveguides. As the signal wavelength is increased, as shown in FIG. 26, the evanescent fields E1 and E2 extend further away from the fiber cores and mode overlap increases. The coupling coefficient likewise increases, since this coefficient is the result of an integration through the core of the fiber (cross-hatched section of FIGS. 25-27) of the evanescent field values E1 and E2. However, for large wavelengths, as shown in FIG. 27, the modes spread out so far into the surrounding cladding that most of the available mode energy is absent from the cross-hatched region of interaction (fiber core).

This phenomenon is further illustrated by FIG. 28 in which the normalized power carried by the cladding (or the core) and the power density at the core-cladding interface is plotted as a function of normalized frequency for a weakly guided fiber. It is clear that at longer wavelengths (lower frequencies), most of the mode is in the fiber cladding (weak guiding). It is also apparent that the power density (and the magnitude of the electric field) at the core-cladding boundary, or for that matter, at any radial position in the cladding, is maximum for a certain signal wavelength. At shorter wavelengths, the energy distribution shifts toward the core (well guided mode), whereas at longer wavelengths, the energy spreads further out, and is thus reduced at any radial position in the core or cladding (loose guiding). The existence of a maximum coupling wavelength in parallel fiber couplers is a consequence of this maximum in the modal power density curve.

Because the mode overlap peaks at a maximum coupling wavelength, the coupling length (the length required for a complete transfer of energy between fibers) exhibits a minimum, for a given fiber spacing H, at this maximum coupling wavelength. Furthermore, the wavelength of optimum coupling or shortest coupling length shifts toward the infrared as the fiber spacing is increased.

Figure 29:
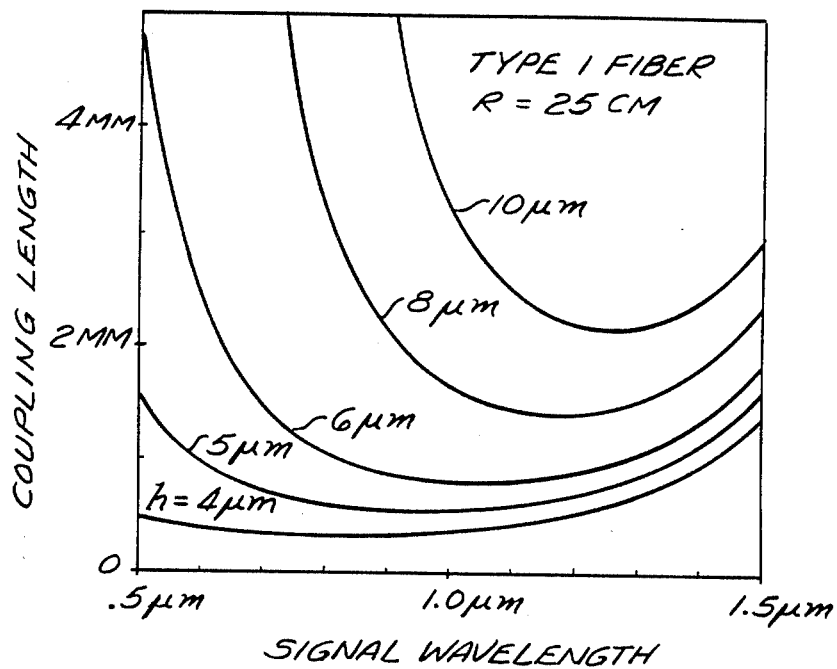
FIG. 29 is a chart of coupling length versus signal wavelength for a type 1 fiber coupler having a fiber radius of 25 centimeters.
Figure 30:
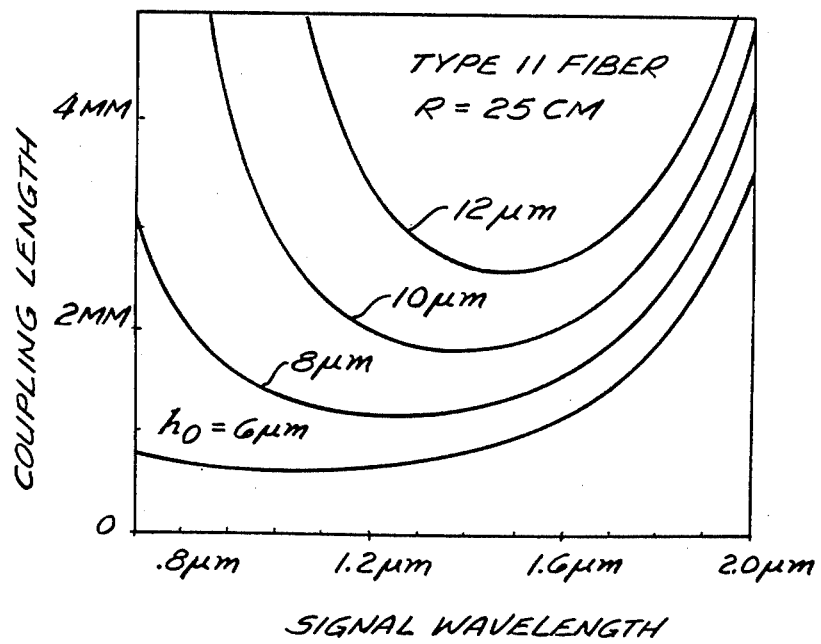
FIG. 30 is a chart of coupling length versus signal wavelength for a type 2 fiber coupler having a fiber radius of 25 centimeters.

The dependence of coupling length on signal wavelengths is represented for two different types of fibers in FIGS. 29 and 30. The type 1 fiber illustrated in FIG. 29 has a fiber radius of two microns, a core refractive index of 1,460, and a cladding refractive index of 1.4559. The type 11 fiber, illustrated in FIG. 30, has a core radius of 3 microns, a core refractive index of 1.458, and cladding refractive index of 1.4551. From these figures, it can be seen that, for a given fiber spacing H, the coupling length is seen to first decrease when the signal wavelength increases from one end of the visible spectrum toward the infrared, and then increases as the wavelength is further increased. Thus, for a given fiber spacing, there is a wavelength that has the shortest coupling length and this wavelength shifts toward the infrared as the fiber spacing is increased.

Wavelength Multiplexing

Figure 31:
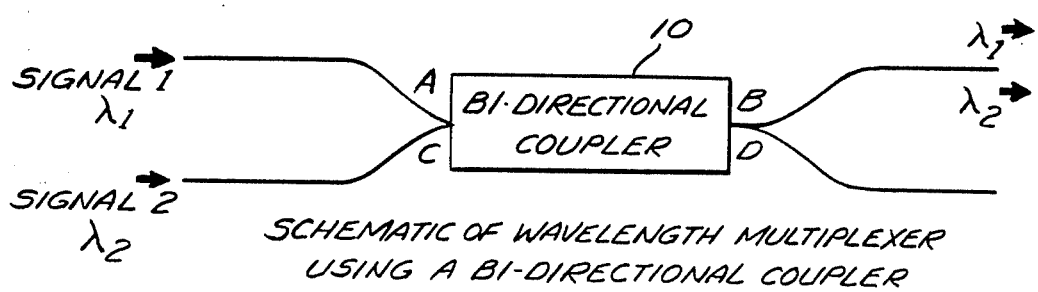
FIG. 31 is a schematic illustration of the multiplexer of the present invention.

Since the coupling length in a single mode fiber coupler, as described in reference to FIGS. 1-4, shows a strong dependence on signal wavelength, as shown in FIGS. 29 and 30, it is possible with properly chosen geometrical parameters for the coupler 10, to totally couple one signal wavelength while a second signal wavelength remains essentially uncoupled. This phenomenon permits the separation of two superimposed signals fed into a single port of the coupler, or the combination of two signals fed into the ports on one side of the coupler 10. Thus, as shown in FIG. 31, if a first signal, signal 1, having a wavelength $\lambda_1$ is fed into port A of coupler 10, and a second signal, signal 2, having a wavelength $\lambda_2$ is coupled to port C, and the geometry is properly selected, both signals can be combined at port B, with virtually no light output at port D. This phenomenon is reversible, that is, if signal 1 and signal 2 are input at port B, they will be separately output at ports A and C.

Figure 32:
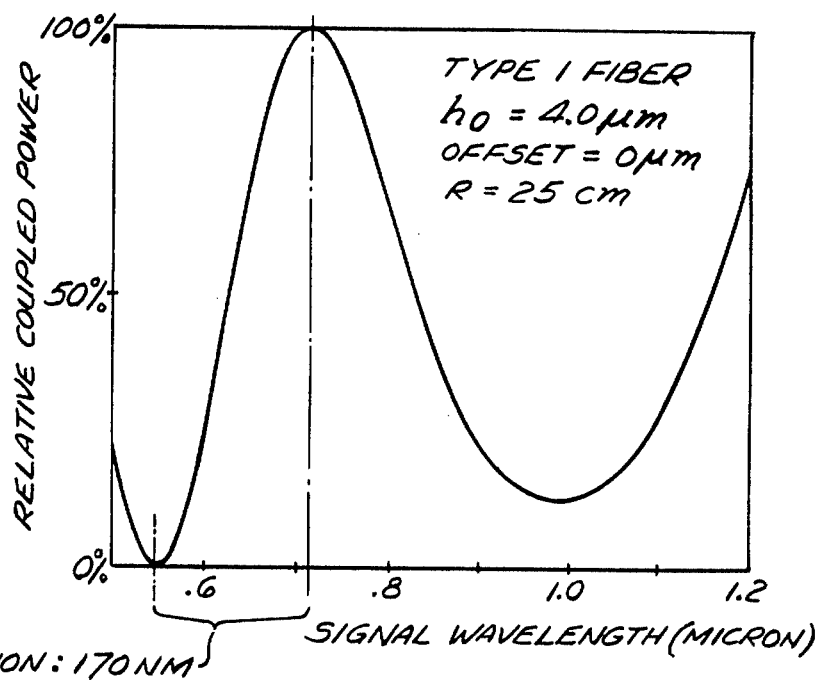
FIG. 32 is a chart showing relative coupled power versus signal wavelength for a type 1 fiber coupler having a minimum fiber spacing of 4 microns, an offset of 0 micron, and a fiber radius of 25 centimeters.

To illustrate this wavelength dependence, FIG. 32 provides a plot of coupled power versus signal wavelength in the visible and near infrared spectrum for a particular coupler geometry. Because for this coupler configuration the effective interaction length of the coupler is an odd multiple of the coupling length for the wavelength 720 nm, but an even multiple of the coupling length for the wavelength 550 nm, the wavelength 720 nm will be 100% coupled, while the wavelength 550 nm will be effectively uncoupled. With different efficiencies, different wavelengths may be combined or separated. For instance, 590 nm and 650 nm may be separated or combined at an 80% efficiency.

Virtually any pair of wavelengths ($\lambda_1, \lambda_2$) may be efficiently combined or separated so long as the effective interaction length is an even multiple of the coupling length for one wavelength and an odd multiple for the coupling length for the other wavelength. As previously explained, as the number of coupling lengths within the effective interaction length increases, the resolution of the multiplexer is enhanced. Because, as shown previously, the effective interaction length is largely a function of the radius of curvature R of the coupler 10, the multiplexer resolution may be enhanced by increasing the radius of curvature R. Provided that the interaction length of the coupler is large enough, virtually any two signals may be exactly mixed or separated, regardless of how closely spaced their wavelengths are.

Since, as described in reference to FIGS. 29 and 30, the coupling lengths show a minimum in the spectral range of interest for typical single mode fibers, care must be taken to operate a multiplexer away from this low resolution point. The position of the minimum coupling length, as described in reference to FIGS. 29 and 30, depends upon the minimum fiber spacing. This parameter can therefore be used to properly bias a coupler for high coupling dispersion in a wavelength range of interest.

Figure 33:
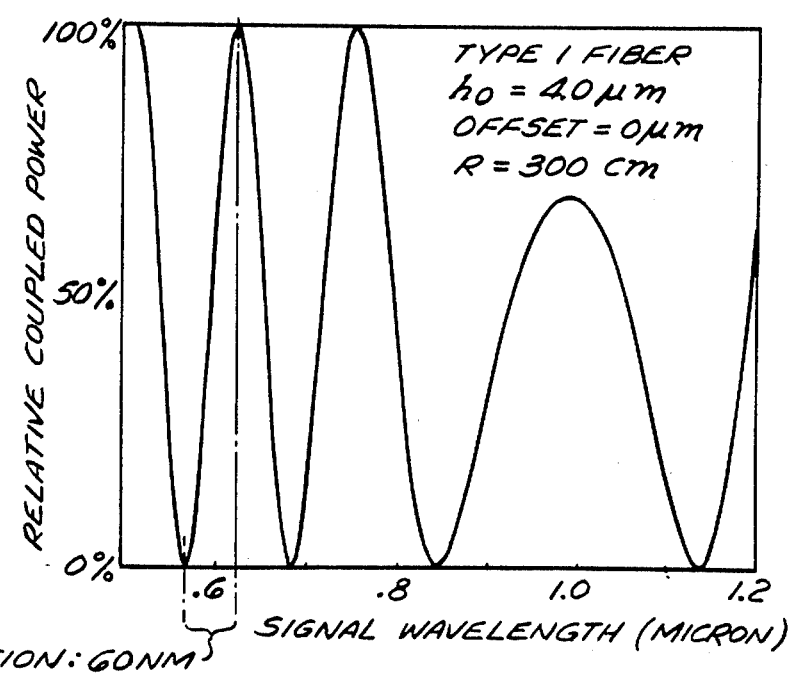
FIG. 33 is a chart of relative coupled power versus signal wavelengths similar to FIG. 32 but with a fiber radius of 200 centimeters.

The interaction length, as was described in reference to FIG. 12, is a function of wavelength, and the resolution is approximately proportional to $(R)^{-\frac{1}{2}}$. As R increases, the effective interaction length increases, and becomes a higher multiple of the coupling length, improving resolution. This result is illustrated in FIG. 33, which is comparable to the graph of FIG. 32, except that the radius of curvature has been increased to 200 centimeters. As anticipated, this increase in radius improves the coupler resolution near $\lambda=600$ nm from approximately 170 nm in the 25 centimeter radius to approximately 60 nm in the 200 centimeter case. Note should also be made of the fact that, as expected from FIG. 29, the coupling length is a minimum at $\lambda=1$ micron, which explains the poorer resolution in this region, as explained previously.

Figure 34:
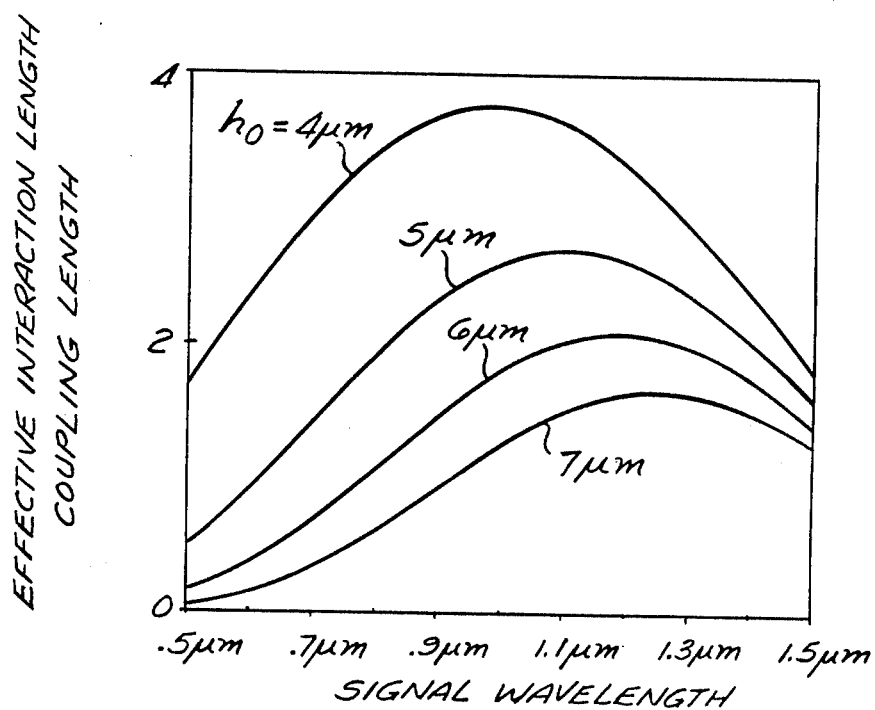
FIG. 34 is a chart of the quotient of the interaction length divided by the coupling length versus signal wavelength for a variety of couplers having different minimum fiber spacings.

It will be recalled that, in reference to FIG. 12, the effective interaction length was shown to be a function of wavelength. Since, as described in reference to FIGS. 29 and 30 the coupling length is also affected by wavelength, the multiple number of coupling lengths within the effective interaction length, which defines the multiplexer resolution, is affected by both of these wavelength dependencies. In this regard, FIG. 34 shows that the quotient of the effective interaction length divided by the coupling length presents a maximum value, and both this maximum value and the wavelength at which it occurs depend on the minimum fiber spacing H. As noted previously, it is difficult to obtain good resolution with a multiplexer operated near a maximum of one of the curves of FIG. 34, since the quotient near this region varies slowly with wavelength. It is thus highly desirable to operate a multiplexing coupler in a region where the slope of this quotient is relatively large. From FIG. 34, it can be seen that this goal can be achieved for any wavelength pair by properly choosing the parameter H, fiber spacing. For example, if efficient multiplexing is desired near a wavelength of 0.9 microns, in a type 1 fiber, a fiber spacing of 5 to 6 microns provides higher slope and thus better resolution.

Once the minimum fiber spacing H has been determined, the radius of curvature R can be selected to provide a frequency separation required ($\lambda_1-\lambda_2$) for the pair of frequencies to be multiplexed. This relationship was previously explained, the effective interaction length being a function of the radius of curvature, and the odd/even multiple requirement for the coupling length for the two frequencies to be separated. It should be noted that a change in the radius of curvature R only scales the effective interaction length, but does not scale the coupling length. Thus, since the position of the maxima of the curves of FIG. 34 are a function of the positions of the minima of coupling length (FIGS. 29 and 30), a change in the radius R scales the curves of FIG. 34, without substantially offsetting their maxima.

The resolution of a multiplexing coupler therefore depends on the two independent parameters, H (fiber spacing) and R (radius of curvature of the fibers). For a given pair of signal wavelengths, efficient mixing will be theoretically achieved by first properly selecting a fiber spacing for the coupler which yields a large wavelength dependence for the quotient of FIG. 34 near the wavelengths of interest (choice of H), and then by selecting a radius of curvature which yields a resolution equal to the difference between the wavelengths (choice of R).

After the resolution of the coupler has been set in accordance with the wavelengths to be separated, the coupler may be tuned to precisely adjust the coupling lengths for the wavelengths of interest so that the effective interaction length is an even multiple of the coupling length of one wavelength and an odd multiple of the coupling length of the other wavelength. This is accomplished by offsetting the fibers, as was described in reference to FIGS. 16 and 17. Such an offset, as was described previously, has the effect of increasing the minimum fiber spacing H and increasing the effective radius of curvature of the fibers. If the required offset is small enough, it will not upset the multiplexer resolution. This stems from the fact that the separation H of a large radius coupler changes rapidly with fiber offset in comparison to changes in the effective radius of curvature with fiber offset.

Figure 35:
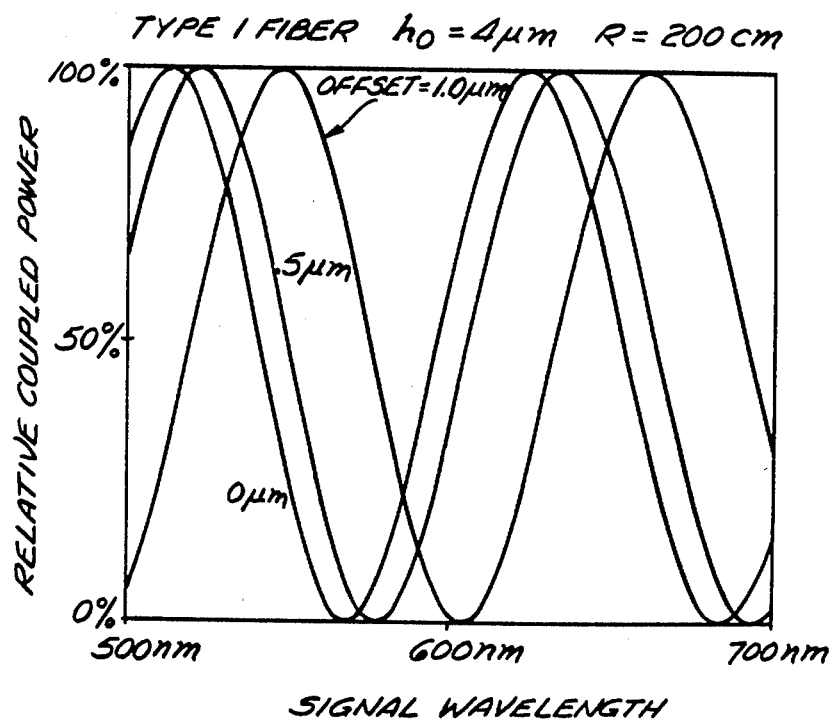
FIG. 35 is a chart of relative coupled power versus signal wavelength for a type 1 fiber coupler having a minimum fiber spacing of 4 microns, a fiber radius of 200 centimeters, and a selectable fiber offset.

To illustrate this tunability of multiplexing couplers, FIG. 35 provides a plot of relative coupled power versus wavelength for three increasing values of fiber offset (0 microns, 0.5 microns, and 1.0 microns). The curve is seen to shift toward increasing wavelengths as the offset increases, while the period of oscillation (or resolution) remains virtually unchanged. In this particular example (R=200 cm, H=4 microns), a 1-micron offset shifts the curve by approximately 45 nm.

From the preceding description, it will be understood that the design of an efficient multiplexer at a given pair of wavelengths ($\lambda 1, \lambda 2$) involves the following steps:

1. The minimum fiber spacing is chosen so that the frequencies of interest are away from a maxima of the curves of FIG. 34.
2. The radius of curvature R is chosen to achieve the required resolution, that is, the radius of curvature should yield an interaction length which provides the necessary number of coupling lengths within the effective interaction length to provide the odd-/even multiple relationship described above.
3. After fabrication, the multiplexer is adjusted by offsetting the two fibers to increase the fiber spacing H, which affects the coupling at both wavelengths $\lambda 1$ and $\lambda 2$, without significantly modifying the wavelength resolution.

The coupler 10 may be mechanically tuned in accordance with the foregoing concepts by means of a tuning device 70, shown in FIG. 36. The device 70 comprises a micrometer carriage 71 having a stepped U-shaped channel 72. The lower portion 74 of the channel 72 is narrower than the upper portion 76, and is sized to rigidly mount the coupler block 16B, with the bottom of the block 16B resting on the bottom of the channel 72. The step transition 79 between the upper of the channel 72. The step transition 79 between the upper portion 76 and lower portion 74 is below the confronting surfaces 14 of the block, so that the upper block 16A may be translated, in a direction perpendicular to the channel portion 76. The coupler 10 is oriented so that the strands 12 are in a direction parallel to the channel 72 to permit such translation to laterally offset the facing surfaces 18.

A pair of cylindrically shaped retainers 78 are slidably mounted to project from one sidewall of the upper portion 76 of the channel 72. These retainers 78 are spring loaded to bear against one side of the block 16A. Differential micrometers 80 are mounted on the opposite sidewall of the channel upper portion 76. The micrometers 80 bear against the opposite side of the block 16A, so that the block 16A is held between the micrometers 80 and the spring biased retainers 78.

By turning the micrometers 80, the position of the block 16A may be adjusted relative to the block 16B to superimpose the fasing surfaces 18. Since the blocks 16 are comprised of transparent quartz, the relative positions of the facing surfaces 18 may be observed by utilizing a microscope. The surfaces 18 may also be laterally offset from their superimposed position, if desired, to tune the coupler 10 to the desired coupling efficiency, by rotating the micrometers 80. Once the coupler 10 has been tuned, the blocks 16 may, if desired, be clamped, bonded, or fused together to provide a coupler with a permanently or semi-permanently fixed offset.

The device 70 may also be used to rotate the facing surfaces 18 relative to each other by turning one of the micrometers 80 to skew the blocks 16.

FIG. 37 illustrates schematically the manner in which the multiplexing coupler of the present invention may be utilized to separate a larger plurality of signal wavelengths. In this illustration, a plurality of multiplexing couplers 100-112 are utilized. One input fiber of the coupler 100 is coupled to a fiber on which eight separate optical wavelengths are transmitted, represented by $\lambda 1$ through $\lambda 8$. In this system, the frequency separation of each pair of adjacent fibers, i.e., ($\lambda 1-\lambda 2$), ($\lambda 2-\lambda 3$), ($\lambda 3-\lambda 4$), etc.; is equal, and will be designated $\Delta\lambda$. The first multiplexing coupler 100 has a resolution equal to $\Delta\lambda$ and will thus couple wavelengths $\lambda 2$, $\lambda 4$, $\lambda 6$, and $\lambda 8$, but will leave virtually uncoupled the remaining wavelengths $\lambda 1$, $\lambda 3$, $\lambda 5$, and $\lambda 7$. These latter wavelengths are coupled to a fiber input of the coupler 102. Similarly, the wavelengths $\lambda 2$, $\lambda 4$, $\lambda 6$, and $\lambda 8$ are coupled to a fiber input of the coupler 104. The couplers 102 and 104 have a resolution equal to $2\Delta\lambda$ and thus separate input wavelengths spaced by $2\Delta\lambda$ onto separate output fibers. For example, the coupler 102 provides essentially no coupling of the wavelengths $\lambda 1$ and $\lambda 5$, but essentially complete coupling of the wavelengths $\lambda 3$ and $\lambda 7$. The fibers from the couplers 102,104 provide inputs to the couplers 106 through 112 which each have a resolution of $4\Delta\lambda$ and thus provide the final separation of the input wavelengths onto separate output fibers. It will be understood that the demultiplexing operation just described may be reversed by providing the input wavelengths $\lambda 1$ through $\lambda 8$ on the appropriate fibers, as shown in FIG. 37, of the couplers 106 through 112. This multiplexing operation will result in all of the wavelengths being combined on the single output fiber of the coupler 100.

To construct this system, the resolutions described above may be adjusted in accordance with the previous description and the frequency for each multiplexing coupler may be selected by tuning the coupler. The resolution for the couplers 102 and 104 is identical, as is the resolution for the couplers 106 through 112. Thus, these groups of couplers are identical in construction but are tuned differently, requiring only three types of couplers for the apparatus shown in FIG. 36, to provide the frequency selection required.

In summary, the fiber optic multiplexer described herein comprises a like single mode optical fiber having a portion joined to a length L of a like single mode optical fiber so that there is one hundred percent evanescent field coupling of one of a pair of wavelengths wherein the product of the coupling coefficient K and the length L equals $\pi/2$, and zero percent evanescent field coupling of the other of the pair of wavelengths wherein such product equals $\pi$.

What is claimed is:

1. A fiber optic multiplexer for combining or separating a pair of optical wavelengths comprising:
a pair of optical fibers, each of said fibers having the same propagation constants, and having a portion of the cladding removed from one side thereof to form respective two dimensional planar oval facing surfaces, said facing surfaces juxtaposed and overlappingly offset at a two dimensional planar cladding interface to place the cores of said fibers in close proximity on opposite sides of said two dimensional planar cladding interface to provide evanescent field coupling between said fibers, the amount of cladding removed and degree of overlap of said planar oval facing surfaces selected to provide an effective interaction length which is substantially an even multiple of the coupling length for a first of said pair of optical wavelengths and substantially an odd multiple of the coupling length for a second of said pair of optical wavelengths.

2. A fiber optic multiplexer, as defined in claim 1, wherein said pair of optical fibers are laterally offset from one another to select said pair of optical wavelengths.

3. A fiber optic multiplexer, as defined in claim 1, wherein said pair of optical fibers are arcuate and wherein the radius of curvature of said arcuate optical fibers is selected to define the frequency difference between said first and second optical wavelengths.

4. A fiber optic multiplexer, as defined in claim 1, wherein said fibers are arcuate and wherein said effective interaction length is a function of the square root of the radius of curvature said arcuate fibers.

5. A fiber optic multiplexer, as defined in claim 1, wherein said pair of optical fibers are arcuately curved, and wherein said effective interaction length is a function of the radius of curvature of said arcuate fibers.

6. A fiber optic multiplexer, as defined in claim 5, wherein said pair of optical fibers are mounted in rigid blocks, said multiplexer additionally comprising:
means for translating said blocks relative one another to select said pair of optical wavelengths.

7. A fiber optic multiplexer, for combining or separating a pair of optical wavelengths, comprising:
a pair of optical fibers which are arcuate along a radius of curvature, each of said fibers having the same propagation constants and having a portion of the cladding removed from one side thereof to form respective two dimensional facing surfaces, said facing surfaces juxtaposed and overlappingly offset to form a two dimensional planar cladding interface to cause said fibers to form an interaction region at which each of said fibers converges and diverges with respect to the other of said pair of fibers to provide an interaction length for said region;
the degree of overlap of said juxtaposed surfaces at said two dimensional interface selected such that said interaction length is substantially equal to an even multiple of a coupling length of said fibers at a first optical wavelength an odd multiple of a coupling length of said fibers at a second optical wavelength, thereby causing said multiplexer to discriminate between the first and second optical wavelengths.

8. A fiber optic multiplexer, as defined in claim 7, wherein said effective interaction length is a function of the square root of the radius of curvature said arcuate optical fibers.

9. A fiber optic multiplexer, as defined in claim 7, wherein said pair of optical fibers are offset from one another in the plane of said fibers by a distance h and are offset from one another in a second plane orthogonal to said plane by a distance y and wherein said interaction length for each of said optical wavelengths is a function of $(h^2+y^2)^{\frac{1}{2}}$.

10. A fiber optic multiplexer, as defined in claim 7, wherein the degree of overlap of said facing surfaces determines the separation of the cores of said optical fibers at said interaction region.

11. A fiber optic multiplexer, as defined in claim 10, wherein said pair of arcuate optical fibers are mounted in respective bases, each of said fibers converging and diverging from one face of said bases, said one face of each of said bases being coplanar with one of said two dimensional facing surfaces, said one face of each of said bases being positioned in a face-to-face relationship.

12. A fiber optic multiplexer, as defined in claim 11, additionally comprising:
means for accurately sliding said one face of said bases relative one another to select said optical wavelengths.

13. A fiber optic multiplexer comprising:
first and second strands of fiber optic material, each of said strands having cladding removed from one side thereof to form respective first and second two dimensional flat oval surfaces on said strands; and
means for positioning said flat surfaces together in close facing overlapping relationship, and for overlappingly offsetting said surfaces to form a region of interaction in which guided modes of the strands interact through their evanescent fields to cause light to be transferred between the core portions of the strands, said region having an effective interaction length which is substantially an odd multiple of a coupling length of a first selected optical wavelength and which is substantially an even multiple of a coupling length of a second selected optical wavelength.

14. A fiber optic directional coupler, comprising:
first and second strands of fiber optic material having a portion of the cladding removed therefrom to form respective two dimensional flat oval cladding surfaces on one side thereof; and
means for overlappingly positioning said flat oval cladding surfaces of said strands together in close facing relationship to form a region of interaction in which guided modes of the strands interact through their evanescent fields to cause light to be transferred between said cores, said cores converging and diverging gradually at said region of interaction, the amount of overlap of said flat oval cladding surfaces selected to overlappingly offset said surfaces to provide an effective interaction length for said region which is substantially an odd multiple of a coupling length of a first selected optical wavelength and which is substantially an even multiple of a coupling length of a second selected optical wavelength.

15. A fiber optic multiplexer, comprising:

first and second arcuate optical fibers, each having a core formed of a material of a first refractive index and a cladding of a second refractive index, said fibers mounted adjacent one another along an interface to form an interaction region, the longitudinal axis of each of said cores lying in a respective plane passing through said interaction region, said arcuate fibers positioned so that said planes are parallel but displaced through said interaction region, the amount of said displacement selected to provide an effective interaction length which is substantially an odd multiple of a coupling length of a first selected optical wavelength and which is substantially an even multiple of a coupling length of a second selected optical wavelength, the area of said interaction region between said cores which is bounded by said displaced planes comprised entirely of material having said second refractive index.

16. A fiber optic coupler, comprising:

a pair of optical fibers, each having fiber optic material removed from one side thereof, to form a flat, oval cladding surface;

means for positioning said pair of fibers to juxtapose said flat, oval cladding surfaces in facing overlappingly relationship to form a region of interaction for coupling light between the cores of said fibers, said interaction region having an interaction length which is substantially an odd multiple of a coupling length of a first selected optical wavelength and which is substantially an even multiple of a coupling length of a second selected optical wavelength; and means for relatively laterally displacing said flat oval cladding surfaces to change the degree of overlap of said flat, oval cladding surfaces to change the coupling at said interaction region such that said interaction length is an odd multiple of a coupling length of a third selected wavelength and an even multiple of a coupling length of a fourth selected wavelength.

17. A method of manufacturing a fiber optic multiplexer to combine or separate a preselected pair of wavelengths ($\lambda_1$, $\lambda_2$), said method comprising:

providing a pair of optical fibers;

selecting the radius of curvature of said optical fibers as a function of the difference between said pair of wavelengths ($\lambda_1$, $\lambda_2$) to set the resolution of said multiplexer;

mounting said fibers in juxtaposition at said radius of curvature to provide an interaction region having an interaction length for coupling light between said fibers, said fibers converging and diverging at said interaction region; and relatively positioning at the cores without changing said radius of curvature of said juxtaposed fibers such that said interaction length is substantially an odd multiple of a coupling length for one of said wavelengths and is substantially an even multiple of a coupling length for the other of said pair of wavelengths.

18. A method of manufacturing a fiber optic multiplexer, as defined by claim 17, additionally comprising the step of:

removing cladding from each of said arcuately mounted fibers to provide respective planar surfaces on one side thereof, the cladding removal accomplished with reference to the wavelengths to provide a core spacing between said fibers, when said planar surfaces are juxtaposed, which yields a substantial difference in the ratio of the effective interaction length to the coupling length for the wavelengths.

19. A method of using a fiber optic directional coupler having:

a pair of blocks having generally planar confronting faces in proximity to each other;

generally aligned slots opening through the faces of the blocks and having bottom walls which converge toward the centers of the slots and diverge toward the edges of the blocks;

a strand of single mode fiber optic material rigidly mounted in each of the slots along a path corresponding to the bottom wall of the slot;

the cladding on the confronting sides of the strands being removed to form facing surfaces even with the faces of the blocks at a predetermined distance from the core portions of the strands to place the core portions in close proximity to each other to form a region of interaction in which light is transferred between the strands;

the predetermined distance being within a predetermined critical zone; and the critical zone defining a region sufficiently close to the core to permit evanescent coupling to occur and sufficiently far from the core to substantially eliminate losses due to mode perturbation, the method comprising the steps of:

positioning the faces of the pair of blocks with respect to each other so that the planar confronting surfaces of the blocks are together in face to face relationship with said facing surfaces overlapping;

selecting the degree of overlap of said facing surfaces by relatively sliding the blocks along their planar confronting surfaces to offset said surfaces to define a region of interaction having a length substantially equal to an odd multiple of a coupling length of a first selected optical wavelength and an even multiple of a coupling length of a second selected optical wavelength; and supplying to said strands a first light signal at said first optical wavelength and a second light signal at said second optical wavelength.

20. A method of using a fiber optic directional coupler, as defined in claim 19, wherein said supplying step comprises supplying said first and second light signals to a single one of said strands to provide a separation onto each of said pair of strands of a different one of said first and second light signals.

21. A method of using a fiber optic directional coupler, as defined in claim 19, wherein said supplying step comprises supplying said first and second light signals to different ones of said strands for combination within said coupler onto a single one of said strands.

22. A method of manufacturing a fiber optic multiplexer, comprising:
mounting a pair of fibers, each of which comprises an inner core surrounded by an outer cladding, by juxtaposing the cladding of said fibers at a planar interface such that (i) each of said fibers forms an arc of radius R lying in a plane, and (ii) the planes of said arcs are offset from one another; and
adjusting the offset of said planes without changing the distance between said cores and said planar interface, so as to define an interaction region between the fibers having a length which is substantially an odd multiple of a coupling length of a first selected optical wavelength and which is substantially an even multiple of a coupling length of a second selected optical wavelength.

23. A method, as defined in claim 22, additionally comprising:
selecting the minimum distance between the fiber cores to provide high resolution capability for said multiplexer.

24. A method, as defined in claim 22, additionally comprising:
selecting R to provide the proper resolution for said multiplexer.

25. A method of multiplexing a pair of optical wavelengths comprising the steps of:
providing two blocks of rigid material with first and second, generally parallel, planar faces, forming a slot across the first face of each of the blocks, each said slot having a greater depth toward the edges of the block than toward the center of the slot,
rigidly mounting a strand of fiber optic material in each of the slots so that the strand extends along a path corresponding to the bottom wall of the slot;
removing material from each of the strands and the first faces of the blocks in a planar fashion to form a two dimensional planar oval cladding surface on each of the strands which is coplanar with the planar first faces of the blocks such that the cladding surface of each strand is within a few microns of the core portion in the center of the slot;
placing the blocks together with the first faces in facing relationship and the core portions of the strands in close proximity to each other so that said two dimensional oval cladding surfaces where the cladding has been removed are in facing relationship and overlap to form a region in which guided modes of the strands interact through their evanescent fields;
adjusting the degree of overlap of said two dimensional cladding surfaces by relatively sliding the first faces of the blocks to overlappingly offset said surfaces to cause light of a first selected wavelength, input to said region in one of the strands, to output said region in the other of the two strands, while light of a second selected wavelength, input to said region in one of the strands, is output from said region in the same strand.

26. A method of making a fiber optic multiplexer, comprising the steps of: rigidly mounting first and second strands of fiber optic material on first and second bases, respectively, removing the cladding on the outer side of each of the strands to within a few microns of the core portion of the strand to form two dimensional oval surfaces on said strands which are contoured to mate with each other at a two dimensional interface, placing the two dimensional oval surfaces together along said two dimensional interface, such that said oval surfaces overlap to place the core portions in close proximity to form a region of interaction, and relatively moving the two dimensional surfaces along the two dimensional interface to adjust the amount of overlap and offset of said oval surfaces to provide an effective interaction length for said region of interaction which is substantially an odd multiple of a coupling length of a first selected optical wavelength and which is substantially an even multiple of a coupling length of a second selected optical wavelength.

27. A method of optical multiplexing, comprising:
juxtaposing a pair of optical fibers at a planar interface, each of said fibers having a core and a cladding, said fibers additionally lying in respective planes passing through both their respective cores and their respective central longitudinal axes, said planes being perpendicular to said planar interface;
accurately adjusting the separation between the cores of said fibers by translating the fibers to change their position with respect to each other at said planar interface;
constraining said fibers to maintain the planes of said fibers perpendicular to the plane of said interface during said translating of said fibers; and
selecting the core spacing of said fibers to define a region of wavelength interaction between the fibers having a length which is substantially an odd multiple of a coupling length of a first selected optical wavelength and which is substantially an even multiple of a coupling length of a second selected optical wavelength, to provide wavelength discrimination.

28. A method of manufacturing a fiber optic multiplexer, comprising:
removing cladding from first and second optical fibers at selected respective locations thereon to form respective mating surfaces on said fibers;
juxtaposing said mating surfaces to overlap with each other to form an over-coupled evanescent interaction zone between said first and second fibers at the point of said juxtaposition;
rigidly mounting said fibers on respective means for mounting;
relatively moving the rigidly mounted fibers to adjust the amount of overlap by relatively moving said mounting means;
selecting the amount of overlap of said surfaces such that the order of said overcoupling for first and second multiplexed wavelengths is even and odd, respectively.

29. A method of manufacturing a fiber optic multiplexer for combining or separating light signals of first and second wavelengths, comprising:
arcuately mounting a pair of fibers along a radius of curvature, each of said fibers having an inner core surrounded by an outer cladding;
constructing a coupler from said arcuately mounted fibers by:
removing cladding from each of said arcuately mounted fibers to provide respective planar surfaces on one side thereof, the cladding removal accomplished with reference to the wavelengths to provide a core spacing between said fibers, when said planar surfaces are juxtaposed, which yields a substantial difference in the ratio of the effective interaction length to the coupling length for the wavelengths;

juxtaposing said planar surfaces to form a planar interface between said fibers, the cores of said fibers on opposite sides of said planar interface; and relatively moving said planar surfaces along the planar interface, without changing the proximity of the cores to said planar interface, until the interaction length is substantially an odd multiple of a coupling length of said first wavelength and is substantially an even multiple of a coupling length of said second wavelength.

* * * * *